(12) United States Patent
Suzuki et al.

(10) Patent No.: US 7,710,956 B2
(45) Date of Patent: May 4, 2010

(54) MOBILE COMMUNICATION CONTROL SYSTEM, NETWORK MANAGEMENT SERVER, MOBILE NODE, ACCESS NODE AND ANCHOR NODE

(75) Inventors: Toshihiro Suzuki, Yokohama (JP); Satoshi Hiyama, Yokohama (JP); Masashi Yamashita, Yokosuka (JP); Ken Igarashi, Yokohama (JP); Shoichi Hirata, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1311 days.

(21) Appl. No.: 10/770,707

(22) Filed: Feb. 4, 2004

(65) Prior Publication Data

US 2004/0156365 A1 Aug. 12, 2004

(30) Foreign Application Priority Data

Feb. 5, 2003 (JP) ............................. 2003-028539

(51) Int. Cl.
*H04L 12/28* (2006.01)
(52) U.S. Cl. .................... 370/389; 370/392; 370/328
(58) Field of Classification Search ................. 370/389, 370/392, 338, 328; 709/245
See application file for complete search history.

(56) References Cited

U.S. PATENT DOCUMENTS

| | | | | |
|---|---|---|---|---|
| 5,883,890 | A * | 3/1999 | Okanoue et al. | 370/338 |
| 6,256,300 | B1 * | 7/2001 | Ahmed et al. | 370/331 |
| 6,434,627 | B1 * | 8/2002 | Millet et al. | 709/245 |
| 6,452,920 | B1 * | 9/2002 | Comstock | 370/349 |
| 6,501,746 | B1 * | 12/2002 | Leung | 370/338 |
| 6,515,974 | B1 * | 2/2003 | Inoue et al. | 370/331 |
| 6,574,214 | B1 * | 6/2003 | Khalil et al. | 370/349 |
| 6,636,498 | B1 * | 10/2003 | Leung | 370/338 |
| 6,690,659 | B1 * | 2/2004 | Ahmed et al. | 370/328 |
| 6,721,297 | B2 * | 4/2004 | Korus et al. | 370/338 |
| 6,842,456 | B1 * | 1/2005 | Chen et al. | 370/401 |
| 6,965,946 | B2 * | 11/2005 | Inoue et al. | 709/245 |

(Continued)

FOREIGN PATENT DOCUMENTS

EP 1 401 173 A1 3/2004

(Continued)

OTHER PUBLICATIONS

Hesham Soliman, et al. "Hierarchical MIPv6 Mobility Management", <draft-ietf-mobileip-hmipv6-03.tet> Internet Engineering Task Force Standard Working Draft, XP-015023554, Feb. 2001, pp. 1-27.

(Continued)

*Primary Examiner*—Ricky Ngo
*Assistant Examiner*—Dewanda Samuel
(74) *Attorney, Agent, or Firm*—Oblon, Spivak, McClelland, Maier & Neustadt, L.L.P.

(57) ABSTRACT

A network management server includes an address manager and an address assignment direction transmitter. The address manager manages a first address, a second address and a third address of the destination mobile terminals in accordance with address assignment information received from a mobile node. The address assignment direction transmitter transmits an address assignment directions for directing a source access node to manage the first address and the second address of the destination mobile terminal, and to transmit an address assignment direction for directing a destination access node to manage the second address and the third address of the destination mobile terminal.

17 Claims, 20 Drawing Sheets

U.S. PATENT DOCUMENTS

| | | | |
|---|---|---|---|
| 7,020,120 B2* | 3/2006 | Inoue et al. | 370/338 |
| 7,020,464 B2* | 3/2006 | Bahl et al. | 455/432.1 |
| 7,136,362 B2* | 11/2006 | Chen | 370/328 |
| 7,136,389 B2* | 11/2006 | Shahrier et al. | 370/400 |
| 7,174,166 B2* | 2/2007 | Song et al. | 455/436 |
| 7,203,492 B2* | 4/2007 | Momona | 455/432.1 |
| 2002/0159478 A1* | 10/2002 | Watanuki et al. | 370/466 |
| 2003/0016655 A1* | 1/2003 | Gwon | 370/352 |
| 2003/0084293 A1* | 5/2003 | Arkko et al. | 713/168 |
| 2003/0193912 A1* | 10/2003 | O'Neill | 370/331 |
| 2003/0193952 A1* | 10/2003 | O'Neill | 370/392 |
| 2003/0224758 A1* | 12/2003 | O'Neil | 455/411 |

FOREIGN PATENT DOCUMENTS

| | | | |
|---|---|---|---|
| GB | 2377862 | * | 1/2003 |
| GB | 2377862 A | * | 1/2003 |
| JP | 2000-244566 | | 9/2000 |
| JP | 2000-341330 | | 12/2000 |
| JP | 2001-111621 | | 4/2001 |
| JP | 2001-339438 | | 12/2001 |
| JP | 2002-185520 | | 6/2002 |
| JP | 2004-112727 | | 4/2004 |
| WO | WO01/19025 A2 | | 3/2001 |
| WO | WO02/15490 A1 | | 2/2002 |

OTHER PUBLICATIONS

Thierry Ernst, "Network Mobility Support in IPv6", Thesis Department of Mathematics and Computer Science, XP-002215680, Oct. 29, 2001, 1-101.

Akira Miura et al., "(2) IP2 Transport Network Technology", NTT DoCoMo Technical Journal, vol. 10, No. 4, pp. 13-18, Jan. 1, 2003 (w/ English Translation).

CS2002-82, Technical Report of IEICE, The Institute of Electronics, Information and Communication Engineers.

NS2003-58, Technical Report of IEICE, The Institute of Electronics, Information and Communication Engineers.

NS2003-244, Technical Report of IEICE, The Institute of Electroncs, Information and Communication Engineers.

T.J. Kniveton, et al., "Mobile Router Tunneling Protocol", Nov. 1, 2002, 34 pages.

P. Thubert, et al., "IPv6 Reverse Routing Header and its application to Mobile Networks", Oct. 11, 2002, 74 pages.

Solomon, J.D,: "Mobile IP. The Internet Unplugged" 1998, Prentice Hall, US, Upper Saddle River, XP002459659 pp. 227-234.

Vadali R. et al.: "Agent-based route optimization for mobile IP" VTC Fall Proceedings. Atlantic City, NJ, Oct 7-11, 2001. IEEE Vehicular Technology Conference, NY: IEEE, US, vol. 1 of 4. conf. 54, Oct. 7, 2001, pp. 2731-2735, XP010562472.

P. Thubert & M. Molteni Cisco Systems P: "Taxonomy of Route Optimization models in the Nemo Context draft-thubert-nemo-ro-taxonomy-00; draft-thubert-nemo-ro-taxonomy-00. txt" IETF Standard-Working-Draft, Internet Engineering Task Force, IETF, CH, Oct. 11, 2002, XP015005500, pp. 1-13.

Okajima I. et al.: "Architecture and mobile Ipv6 extensions supporting mobile networks in mobile communications" VTC Fall 2001. IEEE 54th Vehicular Technology Conference. Proceedings. Atlantic City, NJ, Oct. 7-11, 2001, IEEE Vehicular Technology Conference, NY: IEEE, US, vol. 1 of 4. conf. 54, Oct. 7, 2001, pp. 2533-2537, XP010562429.

Paakkonen P. et al.: "Ipv6 prefix delegation-based addressing solution for a mobile personal area network" Multimedia signal Processing, 2002 IEEE Workshop on Dec. 9-11, 2002, Piscataway, NJ, US, IEEE Dec. 11, 2002, pp. 819-824, XP010642470.

Hesham Soliman et al.: "Hierarchical MIPv6 mobility management" IETF Standard-Working-Draft, Internet Engineering Task Force, IETF, CH, vol. Mobileip, No. 3, Feb. 2001, XP015023354.

Ernst Thierry: "Network Mobility Support in IPv6" Thesis Department of Mathematics and Computer Science, Universite Joseph Fourier, France, Oct. 29, 2001, pp. 1-101, XP002215680.

\* cited by examiner

FIG.14

ROUTING TABLE
(NETWORK MANAGEMENT SERVER NCPF)

| HoA | RA#1 | RA#2 |
|---|---|---|
| 3.3 | c.1 | – |
| 1.1 | a.1 | – |
| 2.2 | b.3 | d.3 |
| 4.4 | b.2 | d.2 |
| 5.5 | b.1 | d.1 |
| ⋮ | ⋮ | ⋮ |

FIG.18

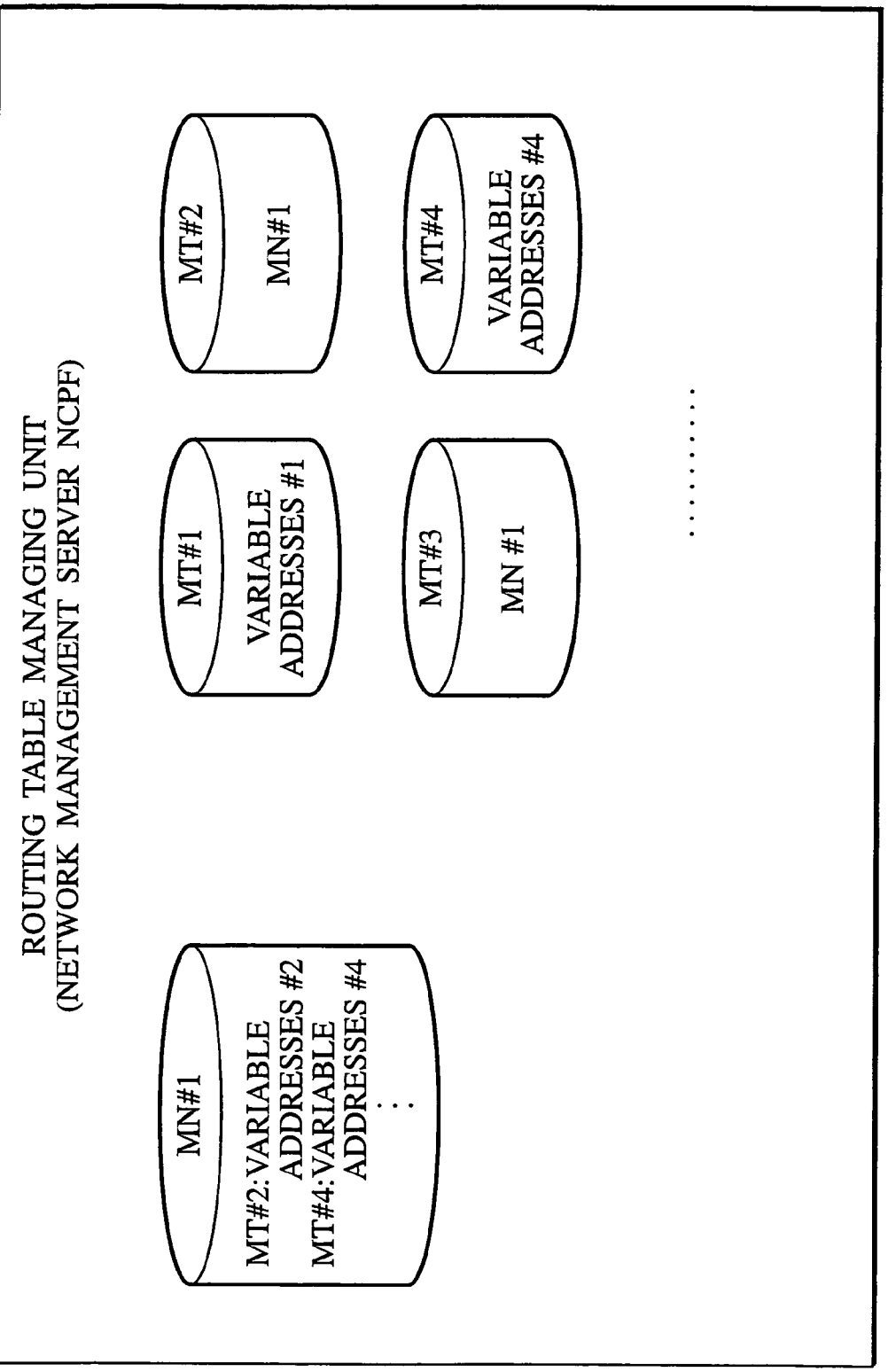

US 7,710,956 B2

MOBILE COMMUNICATION CONTROL SYSTEM, NETWORK MANAGEMENT SERVER, MOBILE NODE, ACCESS NODE AND ANCHOR NODE

CROSS REFERENCE TO RELATED APPLICATION

This application is based upon and claims the benefit of priority from the prior Japanese Patent Application No. P2003-028539, filed on Feb. 5, 2003; the entire contents of which are incorporated herein by reference.

BACKGROUND OF THE INVENTION

1. Field of the Invention

The present invention relates to a mobile communication control system, a network management server, a mobile node, an access node, and an anchor node for supporting a moving network.

2. Description of the Related Art

A mobile communication control system using the Mobile IP (MIP) based "NEMO (Network Mobility) Basic Support" has been conventionally known as a mobile communication control system for supporting a moving network.

A mobile communication control system using the MIP based "NEMO Basic Support" will be described below with reference to FIG. 1 and FIG. 2.

As shown in FIG. 1, the mobile communication control system is configured to transfer a packet from a mobile terminal (source mobile terminal) MT#1 to a mobile terminal (destination mobile terminal) MT#2. The mobile terminal MT#1 is connected to an access node (source access node) AN#1 via a radio link. The mobile terminal MT#2 is connected to a mobile node MN via a radio link.

An action for transmitting a packet in the mobile communication control system will be described with reference to FIG. 2.

As shown in FIG. 2, in Step 1801, the mobile terminal MT#1 transmits a packet 'a' to the access node AN#1 via a radio link. A CoA (Care of Address) and an HoA (Home Address) of the mobile terminal MT#2 are set in a packet header of the packet 'a'.

The mobile terminal MT#1 is assumed to have already acquired the CoA of the mobile terminal MT#2 including location information of the mobile terminal MT#2, from the mobile terminal MT#2.

In Step 1802, the access node AN#1 transfers the received packet 'a' to a home agent HA of the mobile node MN through a core network 1 based on the CoA of the mobile terminal MT#2.

In Step 1803, the home agent HA transfers a packet 'b' to the mobile node MN through the core network 1 and an access node AN#2. The packet 'b' is encapsulated between the home agent HA and the mobile node MN, based on the CoA of the mobile node MN and the address of the home agent HA.

In Step 1804, the mobile node MN transfers a packet 'c' to the mobile terminal MT#2 through a moving network 2. The packet 'c' is obtained by decapsulating the received packet 'b'.

Moreover, a mobile communication control system using the Mobile IP (MIP) based "Source routing technology" has been conventionally known as a mobile communication control system for supporting a moving network.

A mobile communication control system using the MIP based "Reverse Routing header" will be described below with reference to FIG. 1 and FIG. 3.

As shown in FIG. 1, the mobile communication control system is configured to transfer a packet from the mobile terminal (source mobile terminal) MT#1 to the mobile terminal (destination mobile terminal) MT#2

An action for transferring a packet in the mobile communication control system will be described with reference to FIG. 3.

As shown in FIG. 3, in Step 1901, the mobile terminal MT#1 transmits a packet 'a' to the access node AN#1 through the radio link. A CoA of the mobile node MN, a CoA of the mobile terminal MT#2 and an HoA of the mobile terminal MT#2 are set in a packet header of the packet 'a'.

The mobile terminal MT#1 is assumed to have already acquired the CoA of the mobile terminal MT#2 including location information of the mobile terminal MT#2, and the CoA of the mobile node MN including location information of the mobile node MN from the mobile terminal MT#2.

In Step 1902, the mobile node MN translates the received packet 'a' into a packet 'b', and then transfers the packet 'b' to the mobile terminal MT#2 through the moving network 2. The CoA of the mobile terminal MT#2, the CoA of the mobile node MN and the HoA of the mobile node MT#2 are set in a packet header of the packet 'b'.

However, the conventional mobile communication control system using the MIP based "NEMO Basic Support" has a problem in that a header size of the packet becomes large because the encapsulation processing is executed as described above.

Moreover, this mobile communication control system has a problem in that route optimization cannot be achieved because the packet is always routed through the home agent HA of the mobile node MN.

Furthermore, this mobile communication control system has a problem in that location privacy cannot be protected because it is necessary to notify the CoA of the destination mobile terminal MT#2 including the location information of the destination mobile terminal MT#2, to the source mobile terminal MT#1.

In the meantime, the conventional mobile communication control system using the MIP based "Reverse Routing header" has a problem in that a header size of the packet become large because the source mobile terminal MT#1 has to set the CoA of the mobile node MN and the CoA of the destination mobile terminal MT#2 in the packet header.

Moreover, this mobile communication control system has a problem in that location privacy cannot be protected because it is necessary to notify the CoA of the destination mobile terminal MT#2 including the location information of the destination mobile terminal MT#2 and the CoA of the mobile node MN including the location information of the mobile node MN, to the source mobile terminal MT#1.

BRIEF SUMMARY OF THE INVENTION

In view of the foregoing, it is an object of the present invention to provide a mobile communication control system, a network management server, a mobile node, an access node, and an anchor node for supporting a moving network, so as to solve the above-described problems of the header size of a packet, the route optimization, and the location privacy.

A first aspect of the present invention is summarized as a mobile communication control system having a plurality of access nodes and a mobile node. A source access node to which a source mobile terminal is connected via a radio link includes an address manager, an address changer and a router. The address manager is configured to manage a first address and a second address of a destination mobile terminal connected to the mobile node via a radio link. The address changer is configured to change a destination address in a packet transmitted from the source mobile terminal, from the first address of the destination mobile terminal to the second address of the destination mobile terminal. The router is configured to route the packet to a destination access node to which the mobile node is connected via a radio link, in accordance with the changed destination address. The destination access node includes an address manager, an address changer and a router. The address manager is configured to manage the second address and a third address of the destination mobile terminal. The address changer is configured to change the destination address in the received packet, from the second address of the destination mobile terminal to the third address of the destination mobile terminal. The router is configured to route the packet to the mobile node in accordance with the changed destination address. The mobile node includes an address manager, an address changer and a packet transmitter. The address manager is configured to manage the first address and the third address of the destination mobile terminal. The address changer is configured to change the destination address in the received packet, from the third address of the destination mobile terminal to the first address of the destination mobile terminal. The packet transmitter is configured to transmit the packet to the destination mobile terminal in accordance with the changed destination address.

A second aspect of the present invention is summarized as a network management server in a mobile communication network for transferring a packet to the destination mobile terminal. The network management server includes an address manager and an address assignment direction transmitter. The address manager is configured to manage a first address, a second address and a third address of the destination mobile terminal in accordance with address assignment information received from the mobile node. The address assignment direction transmitter is configured to transmit at least two address assignment directions. A first address assignment direction directs the source access node to manage the first address and the second address of the destination mobile terminal. And a second address assignment direction directs the destination access node to manage the second address and the third address of the destination mobile terminal.

A third aspect of the present invention is summarized as a network management server in a mobile communication network for transferring a packet to the destination mobile terminal. The network management server includes an address manager and an address assignment direction transmitter. The address manager is configured to manage a first address, a second address and a third address of the destination mobile terminals in accordance with address assignment information received from the destination access node. The address assignment direction transmitter is configured to transmit an address assignment direction. The address assignment direction directs the source access node to manage the first address and the second address of the destination mobile terminal.

A fourth aspect of the present invention is summarized as a mobile node in a mobile communication network for transferring a packet from the source mobile terminal to the destination mobile terminal. The mobile node includes an address manager, an address changer, a packet transmitter and an address assignment information transmitter. The address manager is configured to manage a first address and a third address of the destination mobile terminal. The address changer is configured to change a destination address in the packet transmitted from the source access node, from the third address of the destination mobile terminal to the first address of the destination mobile terminal. The packet transmitter is configured to transmit the packet to the destination mobile terminal in accordance with the changed destination address. The address assignment information transmitter is configured to transmit address assignment information including the first address and the third address of the new mobile terminal to a network management server in accordance with an address assignment request transmitted from a new mobile terminal.

A fifth aspect of the present invention is summarized as an access node in a mobile communication network for transferring a packet to the destination mobile terminal. The access node includes an address manager, an address changer, a router and an address assignment information transmitter. The address manager is configured to manage second addresses and third addresses of the mobile terminals connected to the mobile node. The address changer is configured to change a destination address in the packet transmitted from the source access node, from the second address of the destination mobile terminal to the third address of the destination mobile terminal. The router is configured to route the packet to the mobile node in accordance with the changed destination address. The address assignment information transmitter is configured to transmit address assignment information including the second address and the third address of the destination mobile terminal to a network management server in accordance with an address assignment request transmitted from the mobile node.

A sixth aspect of the present invention is summarized as a mobile communication control system having a plurality of access nodes, an anchor node and a mobile node. The source access node includes an address manager, an address changer and a router. The address manager is configured to manage a first address and a second address of the destination mobile terminal. The address changer is configured to change a destination address in a packet transmitted from the source mobile terminal, from the first address of the destination mobile terminal to the second address of the destination mobile terminal. The router is configured to route the packet to the anchor node in accordance with the changed destination address. The anchor node includes an address manager, an address changer and a router. The address manager is configured to manage the second address and a third address of the destination mobile terminal and encapsulation information for specifying the mobile node. The address changer is configured to change a destination address in the packet transmitted from the source access node, from the second address of the destination mobile terminal to the third address of the destination mobile terminal, and to encapsulate the packet using the encapsulation information. The router is configured to route the packet to the destination access node in accordance with the encapsulation information. The destination access node includes an address manager and a router. The address manager is configured to manage the encapsulation information. The router is configured to decapsulate the received packet, and to route the packet to the mobile node specified by the encapsulation information encapsulated in the packet, when the packet includes the third address of the destination mobile terminal. The mobile node includes an address manager, an address changer and a packet transmitter. The address manager is configured to manage the first address and the third address of the destination mobile terminal. The address changer is configured to change a destination address in the received packet, from the third address of the destination mobile terminal to the first address of the destination mobile terminal. The packet transmitter is configured to transmit the packet to the destination mobile terminal in accordance with the changed destination address.

A seventh aspect of the present invention is summarized as a network management server in a mobile communication network for transferring a packet to the destination mobile terminal via an anchor node. The network management server includes an address manager and an address assignment direction transmitter. The address manager is configured to manage a first address, a second address and a third address of a new mobile terminal and the encapsulation information, in accordance with address assignment information for the new mobile terminal received from the mobile node. The address assignment direction transmitter is configured to transmit an address assignment direction for directing the source access node to manage the first address and the second address of the new mobile terminal, and to transmit an address assignment direction for directing the anchor node to manage the second address and the third address of the new mobile terminal and the encapsulation information.

A eighth aspect of the present invention is summarized as a network management server in a mobile communication network for transferring a packet to the destination mobile terminal via an anchor node. The network management server includes an address manager and an address assignment direction transmitter. The address manager is configured to manage a first address, a second address and a third address of the destination mobile terminal and the encapsulation information in accordance with address assignment information received from the mobile node. The address assignment direction transmitter is configured to transmit an address assignment direction for directing the anchor node to manage the second address and the third address of the destination mobile terminal and the encapsulation information.

A ninth aspect of the present invention is summarized as an access node in a mobile communication network for transferring a packet to the destination mobile terminal via an anchor node. The access node includes an address manager and a router. The address manager is configured to manage the encapsulation information. The router is configured to decapsulate the packet and route the decapsulated packet to the mobile node specified by the encapsulation information encapsulated in the packet, when an address of the destination mobile terminal is included in the packet received from the anchor node.

A tenth aspect of the present invention is summarized as an anchor node in a mobile communication network for transferring a packet to the destination mobile terminal via the anchor node. The anchor node includes an address manager, an address changer and a router. The address manager is configured to manage a second address and a third address of the destination mobile terminal and the encapsulation information. The address changer is configured to change a destination address in the packet transmitted from the source access node, from the second address of the destination mobile terminal to the third address of the destination mobile terminal, and to encapsulate the packet using the encapsulation information. The router is configured to route the encapsulated packet to the destination access node in accordance with the encapsulation information.

A eleventh aspect of the present invention is summarized as a mobile communication control system having a plurality of access nodes and a mobile node. The source access node includes an address manager, an address changer and a router. The address manager is configured to manage a first address and a second address of the destination mobile terminal. The address changer is configured to change a destination address in a packet transmitted from the source mobile terminal, from the first address of the destination mobile terminal to the second address of the destination mobile terminal. The router is configured to route the packet to the mobile node in accordance with the changed destination address. The mobile node includes an address manager, an address changer and a packet transmitter. The address manager is configured to manage the first address and the second address of a destination mobile terminal. The address changer is configured to change a destination address in the received packet, from the second address of the destination mobile terminal to the first address of the destination mobile terminal. The packet transmitter is configured to transmit the packet to the destination mobile terminal in accordance with the changed destination address.

A twelfth aspect of the present invention is summarized as a mobile node in a mobile communication network for transferring a packet to the destination mobile terminal. The mobile node includes an address manager, an address changer and a packet transmitter. The address manager is configured to manage a first address and a second address of the destination mobile terminal. The address changer is configured to change a destination address in the packet transmitted from the source access node, from the second address of the destination mobile terminal to the first address of the destination mobile terminal. The packet transmitter is configured to transmit the packet to the destination mobile terminal in accordance with the changed destination address. The address manager assigns a second address of a new mobile terminal included in a predetermined address area assigned by the destination access node in accordance with an address assignment request transmitted from the new mobile terminal, so as to manage the first address and the second address of the new mobile terminal.

A thirteenth aspect of the present invention is summarized as an access node in a mobile communication network for transferring a packet to the destination mobile terminal. The access node includes an address assigner configured to assign a predetermined address area to the mobile node in accordance with an address assignment request transmitted from the mobile node. The predetermined address area is selected from among address areas assigned to the destination access node.

A fourteenth aspect of the present invention is summarized as a network management server in a mobile communication network for transferring a packet to the destination mobile terminal. The network management server manages all addresses of a plurality of destination mobile terminals connected to the mobile node via radio links.

BRIEF DESCRIPTION OF THE SEVERAL VIEWS OF THE DRAWINGS

FIG. 14 is diagram showing an example of a routing table to be managed by a network management server of the mobile communication control system according to the second embodiment of the present invention.

FIG. 18 is an overall block diagram of a mobile communication control system according to a third embodiment of the present invention.

FIG. 20 is a view showing an example of a routing table managing unit in a network management server of a mobile communication control system according to a fourth embodiment of the present invention.

DETAILED DESCRIPTION OF THE INVENTION (A Configuration of a Mobile Communication Control System According to a First Embodiment of the Present Invention)

A configuration of a mobile communication control system according to a first embodiment of the present invention will be described with reference to FIG. 4 to FIG. 8.

Figure 1:
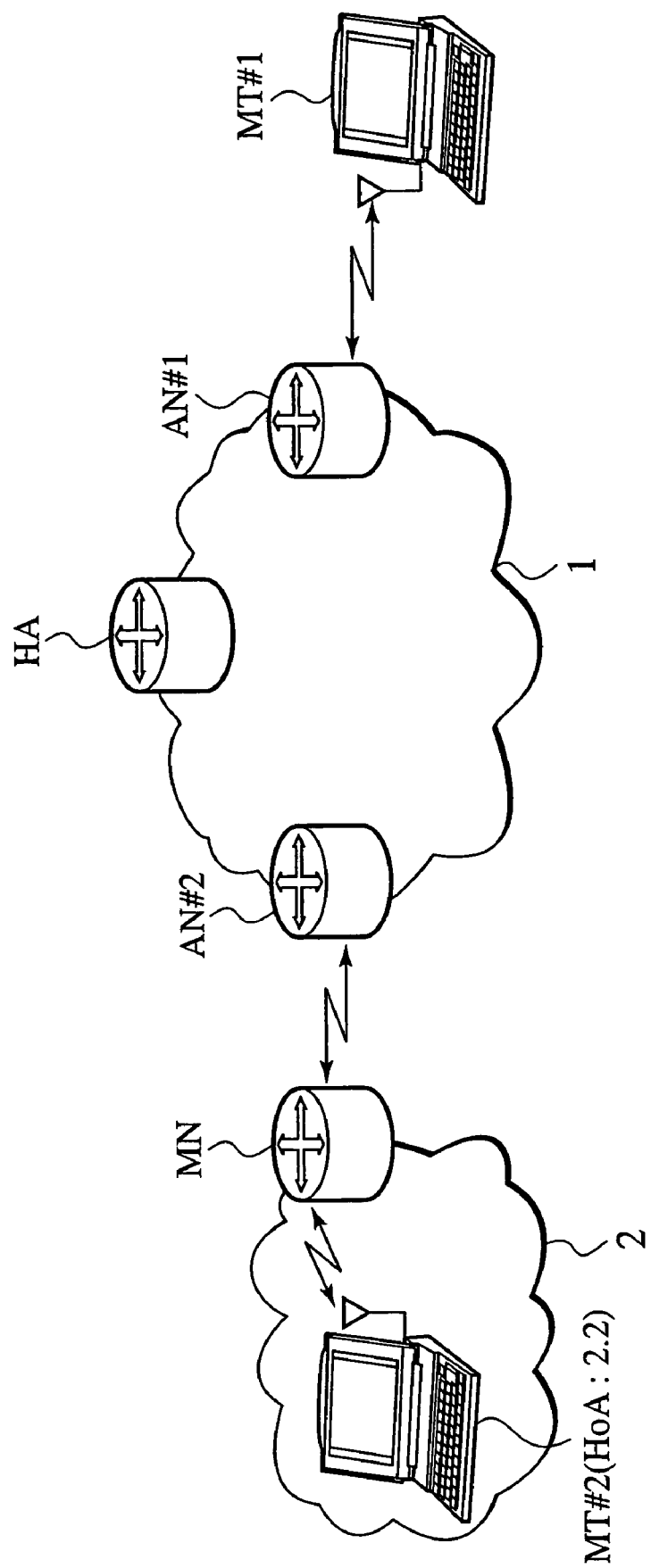
FIG. 1 is an overall block diagram of a mobile communication control system according to the related art.
Figure 2:
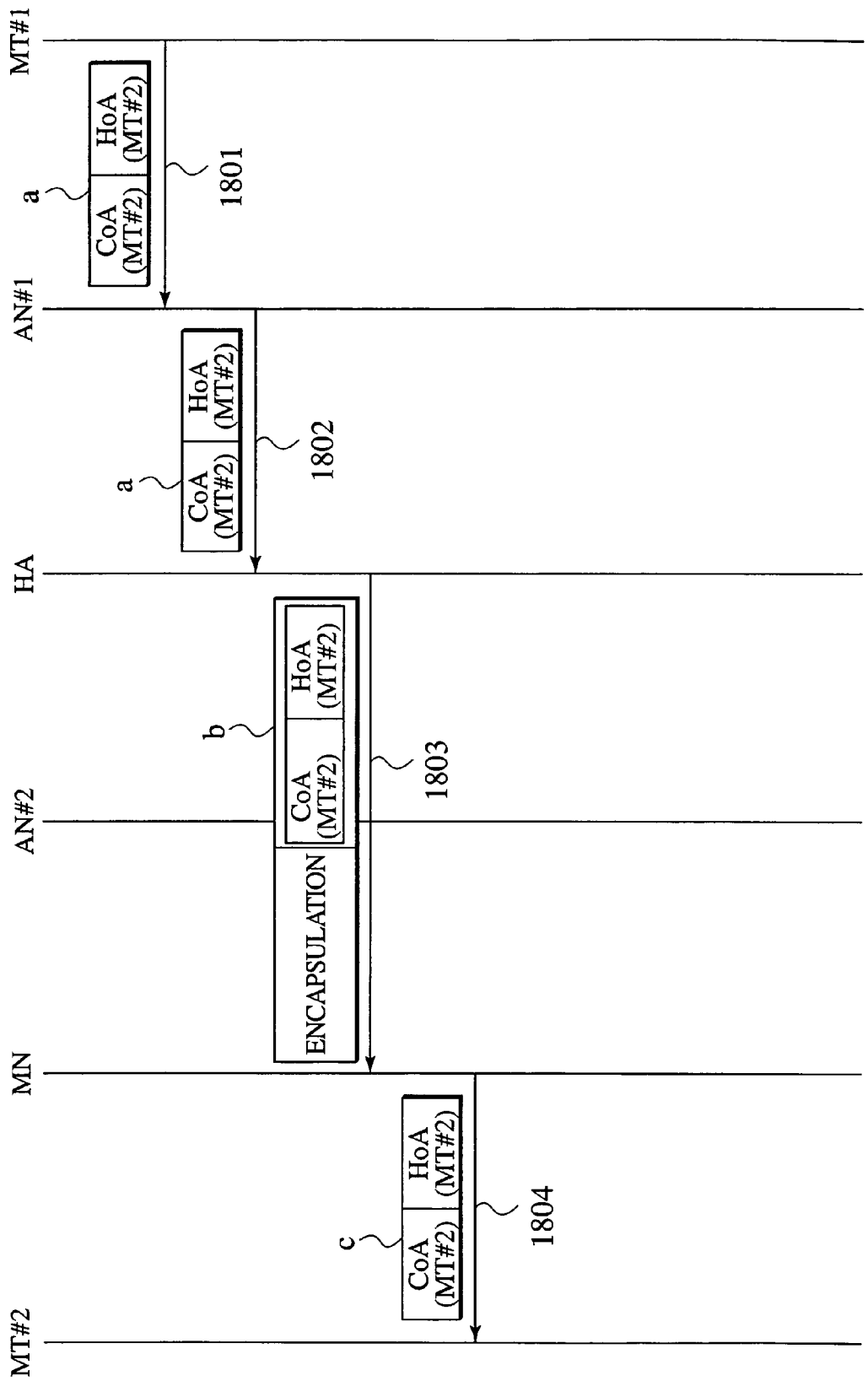
FIG. 2 is a sequence diagram showing a packet transfer action in the mobile communication control system according to the related art.
Figure 3:
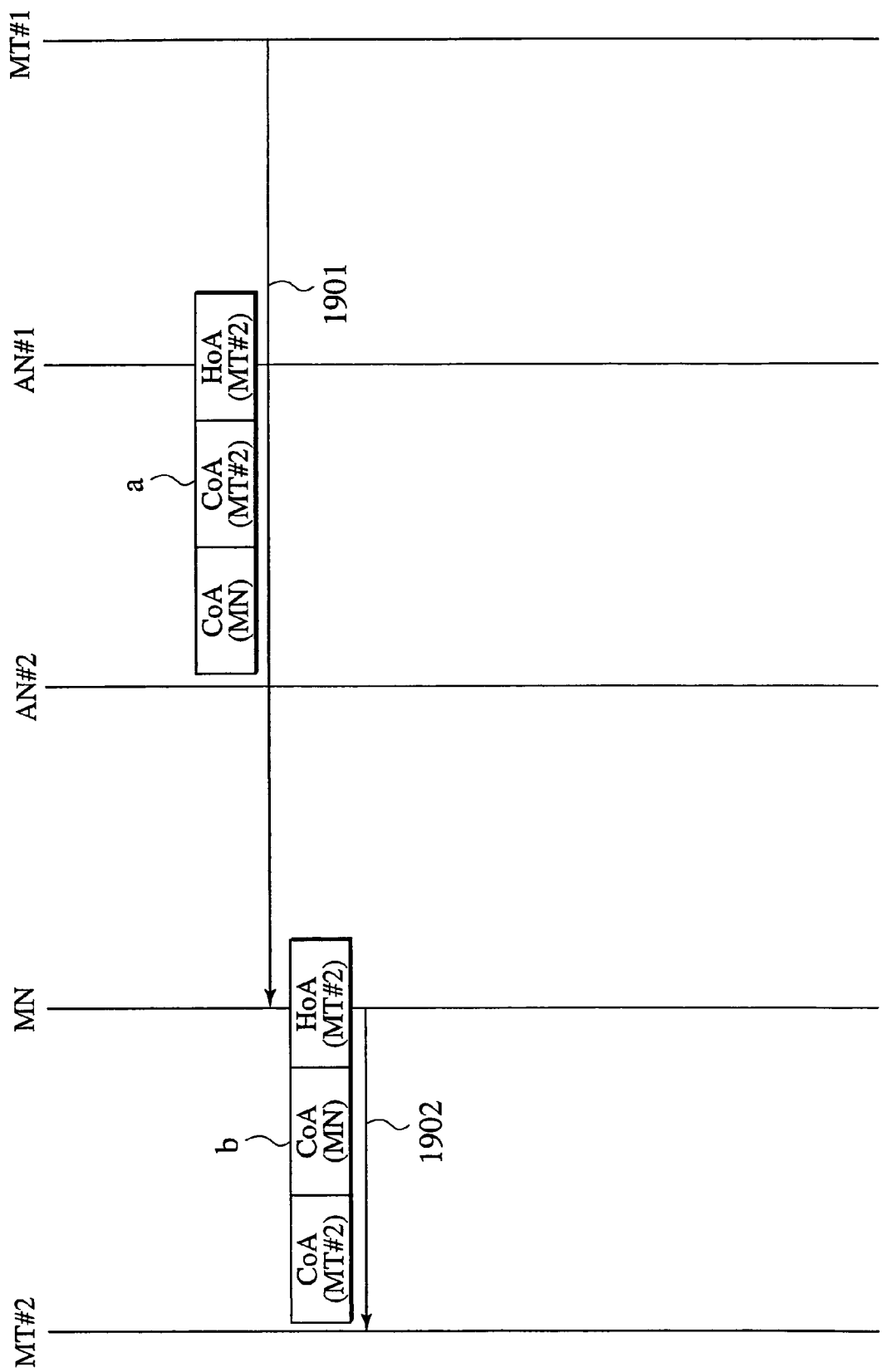
FIG. 3 is another sequence diagram showing a packet transfer action in the mobile communication control system according to the related art.
Figure 4:
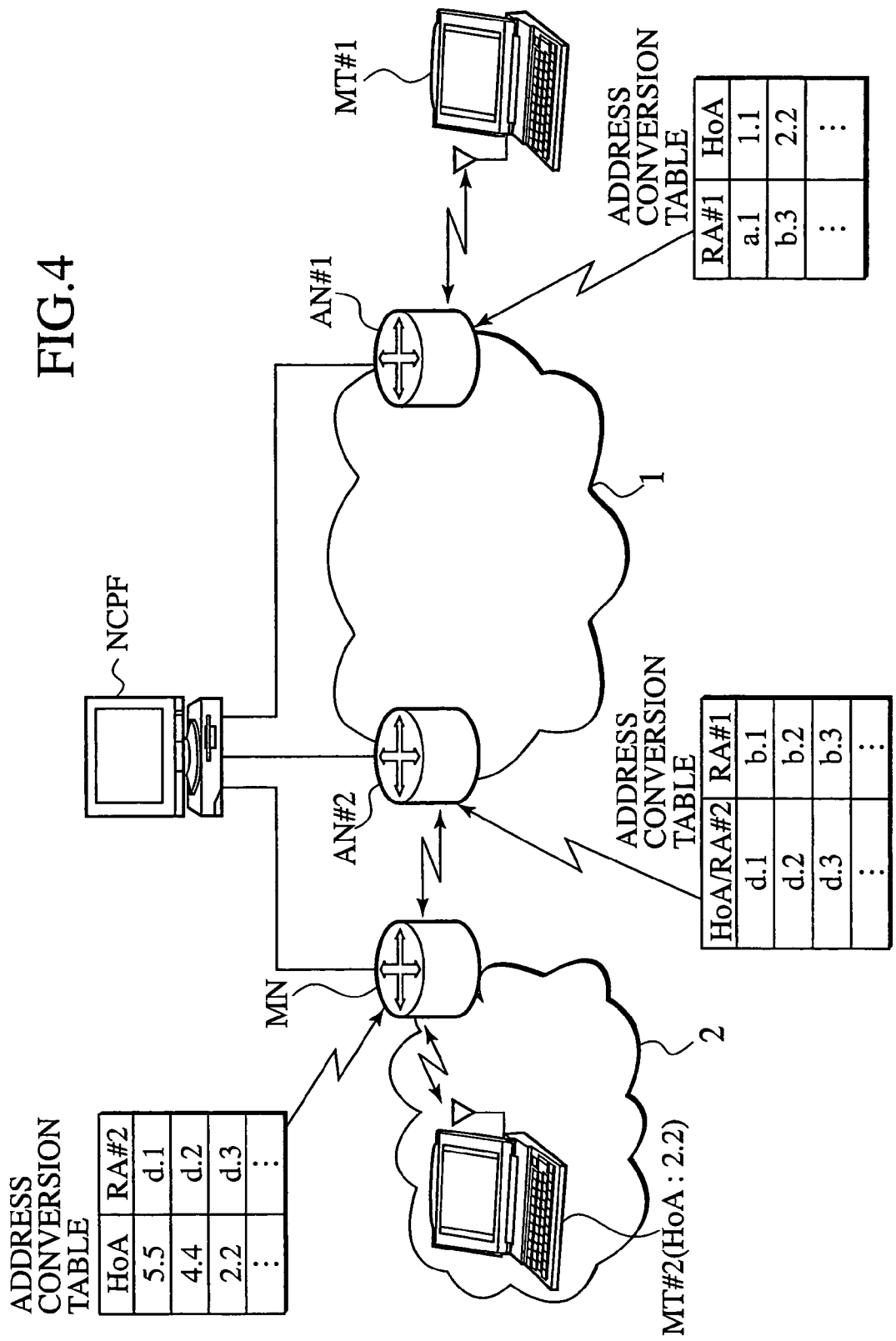
FIG. 4 is an overall block diagram of a mobile communication control system according to a first embodiment of the present invention.

As shown in FIG. 4, the mobile communication control system of this embodiment is configured to transfer a packet from a mobile terminal (source mobile terminal) MT#1 to a mobile terminal (destination mobile terminal) MT#2, through an access node (source access node) AN#1, an access node (destination access node) AN#2 and a mobile node MN. The mobile terminal MT#1 is connected to the access node AN#1 via a radio link. The mobile terminal MT#2 is connected to the mobile node MN via a radio link.

The mobile communication control system of this embodiment includes a network management server (NCPF: Network Control Platform), a plurality of access nodes AN#1 and AN#2, and a mobile node MN.

In this embodiment, the access nodes AN and the mobile node MN can be composed of arbitrary devices (for example, router devices) which include the functions to be described later.

The network management server NCPF is connected to the plurality of access nodes AN#1 and AN#2 and to the mobile node MN. The network management server NCPF is configured to manage routing addresses RA of all the mobile terminals MT in a core network 1.

In this embodiment, the routing addresses RA are addresses specific to the core network 1. The routing addresses RA include a first routing address (second address) RA#1 and a second routing address (third address) RA#2.

Figure 5:
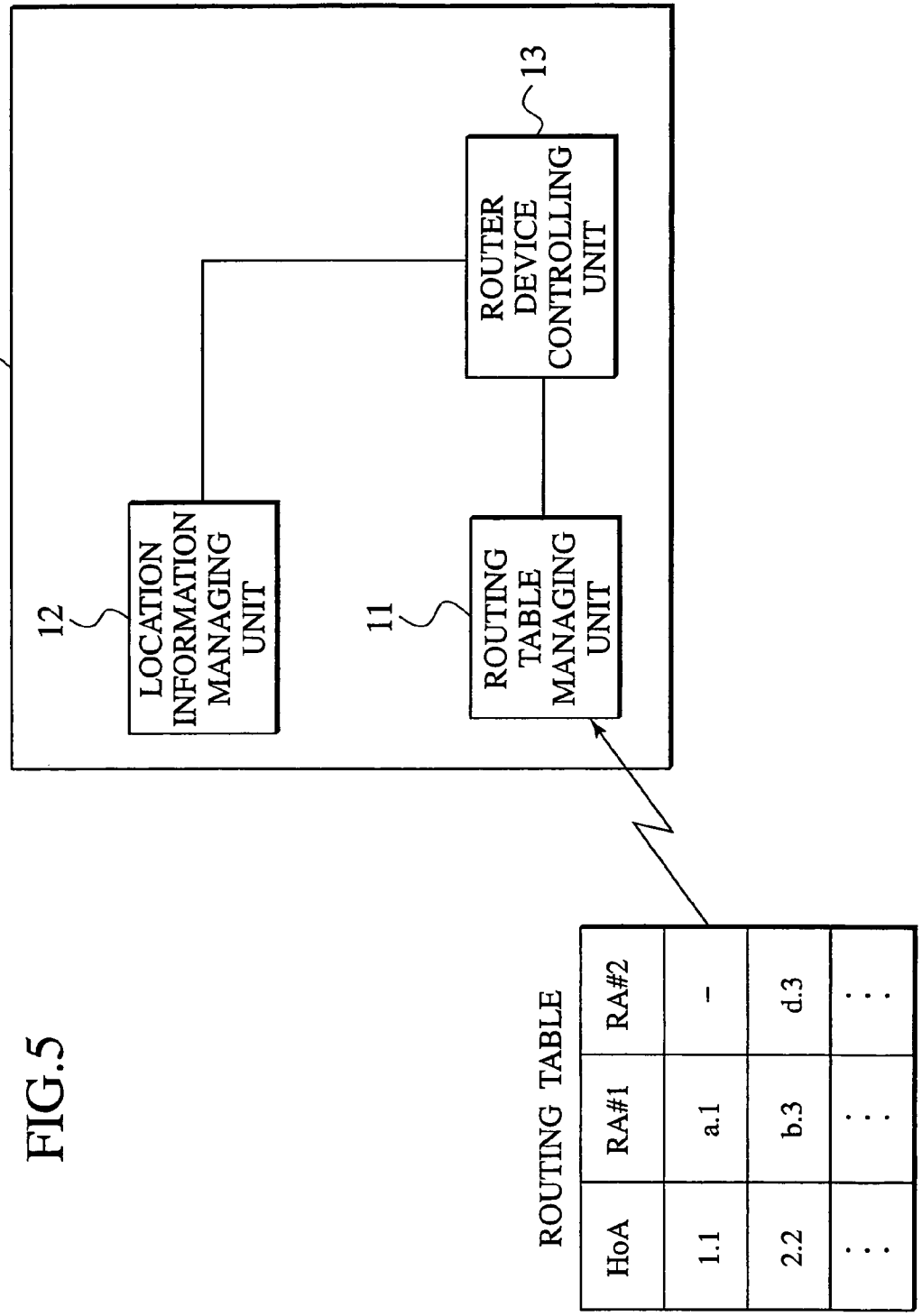
FIG. 5 is a functional block diagram of a network management server of the mobile communication control system according to the first embodiment of the present invention.

As shown in FIG. 5, the network management server NCPF includes a routing table managing unit 11, a location information managing unit 12, and a router device controlling unit 13.

The routing table managing unit 11 constitutes an address manager configured to manage a routing table for mutually linking home addresses (first addresses) HoAs, the first routing addresses (second addresses) RA#1, and the second routing addresses (third addresses) RA#2 in terms of all the mobile terminals MT in the core network 1.

The routing table managing unit 11 updates the routing table in response to address assignment information from the mobile node MN or from access nodes AN#1 and AN#2.

The location information managing unit 12 is configured to manage location information of all the mobile terminals MT in the core network 1.

The router device controlling unit 13 is configured to receive control information such as the address assignment information from the access nodes AN#1 and AN#2 and from the mobile node MN by use of a predetermined communication protocol.

For example, the router device controlling unit 13 constitutes an address direction transmitter configured to transmit an address assignment direction for a mobile terminal (new mobile terminal) MT to the access node (source access node) AN#1 and the access node (destination access node) AN#2, in accordance with an address assignment request transmitted from the mobile terminal (new mobile terminal) MT through a moving network 2.

The moving network 2 includes a plurality of mobile terminals MT and a mobile node MN. The mobile node MN can connect the moving network 2 to any access node AN.

Moreover, the router device controlling unit 13 constitutes an address assignment direction transmitter configured to transmit an address assignment direction for all the mobile terminals MT connected to the mobile node MN via a radio link, to the access node (source access node) AN#1, upon a handover of the mobile node MN.

Figure 6:
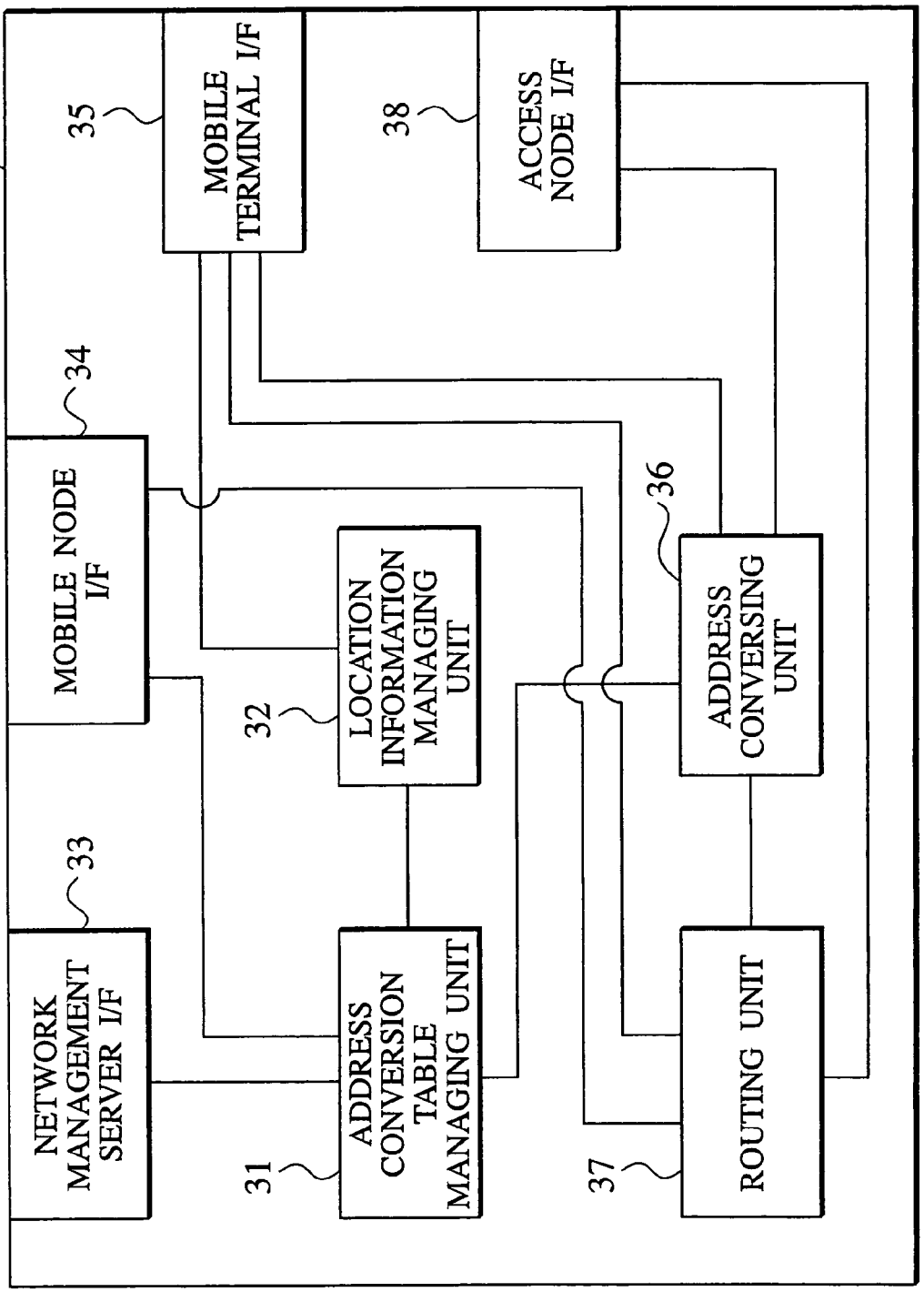
FIG. 6 is a functional block diagram of an access node of the mobile communication control system according to the first embodiment of the present invention.

As shown in FIG. 6, the access node AN includes an address conversion table managing unit 31, a location information managing unit 32, a network management server interface (I/F) 33, a mobile node I/F 34, a mobile terminal I/F 35, an address converting unit 36, a routing unit 37, and an access node I/F 38.

The address conversion table managing unit 31 is configured to manage an address conversion table used for address conversion of the destination mobile terminal MT. The address conversion table managing unit 31 updates the address conversion table in response to the address assignment direction from the network management server NCPF.

In this embodiment, the address conversion table managing unit 31 of the access node (source access node) AN#1 constitutes an address manager configured to manage the address conversion table for associating the home address (first address) HoA of the mobile terminal MT#2 (destination mobile terminal) connected to the mobile node MN via a radio link with the first routing address (second address) RA#1.

Meanwhile, the address conversion table managing unit 31 of the access node (destination access node) AN#2 constitutes an address manager configured to manage the address conversion table for associating the first routing address (second address) RA#1 of the mobile terminal (destination mobile communication terminal) MT#2 with the second routing address (third address) RA#2.

Moreover, the address conversion table managing unit 31 of the access node AN#2 constitutes an address assignment information transmitter configured to assign predetermined second routing addresses RA#2 to all the mobile terminals MT which is connected to the mobile node MN via a radio link in response to an address assignment request transmitted from the mobile node MN connected to the access node AN#2 via a radio link, and thereby to transmit the address assignment information including the second routing addresses RA#2 to the network management server NCPF.

The address conversion table managing unit 31 may be configured to assign the predetermined second routing addresses RA#2 to all the mobile terminals MT in response to a direction from the network management server NCPF instead.

The location information managing unit 32 of the access node AN#1 is configured to manage location information of the mobile nodes MN existing in a cell to be managed by the access node AN#1.

The network management server I/F 33 is configured to function as a communication interface with the network management server NCPF. For example, the network management server I/F 33 receives the address assignment direction from the network management server NCPF.

The mobile node I/F 34 is configured to function as a communication interface with the mobile node MN connected to the access node AN via a radio link. For example, the mobile node I/F 34 receives the address assignment request from the mobile node MN.

The mobile terminal I/F 35 is configured to function as a communication interface with the mobile terminal MT connected to the access node AN via a radio link. For example, the mobile terminal I/F 35 receives a location information registration request from the mobile terminal MT.

Moreover, the mobile terminal I/F 35 transmits/receives the packet to/from the mobile terminal MT through the radio link.

The address converting unit 36 is configured to convert a destination address in the packet received through the mobile node I/F 34, the mobile terminal I/F 35 or the access node I/F 38, by making reference to the address conversion table.

In this embodiment, the address converting unit 36 of the access node AN#1 changes a destination address in the packet transmitted from the mobile terminal (source mobile terminal) MT#1, from the home address (first address) HoA of the mobile terminal (destination mobile terminal) MT#2 to the first routing address (second address) RA#1 of the mobile terminal (destination mobile terminal) MT#2.

Meanwhile, the address converting unit 36 of the access node AN#2 changes a destination address in the packet received through the core network 1, from the first routing address (second address) RA#1 of the mobile terminal (destination mobile terminal) MT#2 to the second routing address (third address) RA#2 of the mobile terminal (destination mobile terminal) MT#2.

The routing unit 37 is configured to route the packet based on the changed destination address. The routing unit 37 of the access node AN#1 routes the packet to the access node AN#2 connected to the mobile node MN via a radio link, based on the changed destination address. Meanwhile, the routing unit 37 of the access node AN#2 routes the packet to the mobile node MN based on the changed destination address.

The access node I/F 38 is configured to function as a communication interface with other access nodes ANs in the core network. For example, the access node I/F 38 transmits/receives the packet to/from other access nodes ANs.

Figure 7:
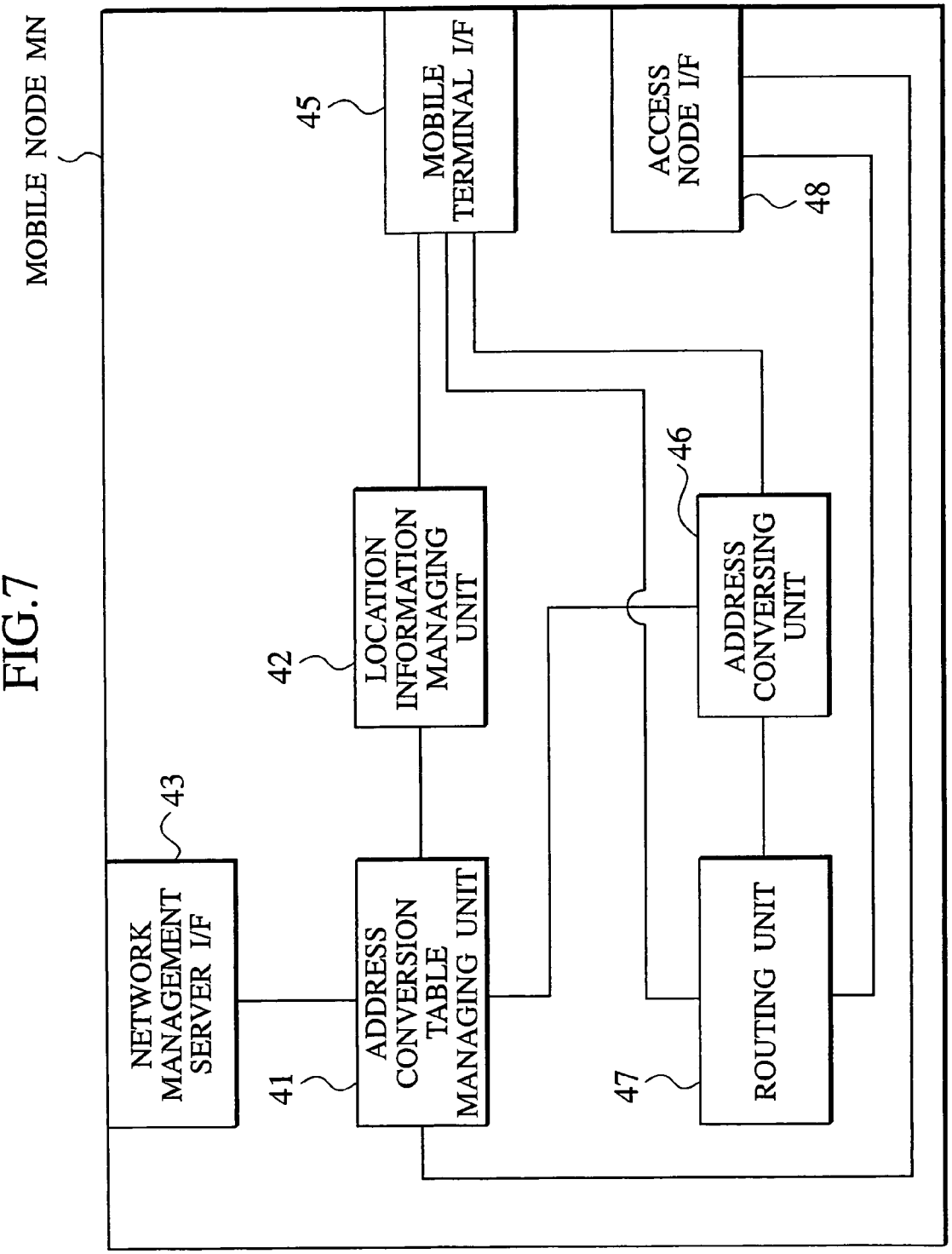
FIG. 7 is a functional block diagram of a mobile node of the mobile communication control system according to the first embodiment of the present invention.

As shown in FIG. 7, the mobile node MN includes an address conversion table managing unit 41, a location information managing unit 42, a network management server I/F 43, a mobile terminal I/F 45, an address converting unit 46, a routing unit 47, and an access node I/F 48.

Since the functions of the respective units of the mobile node MN are basically the same as the functions of the respective units of the access node AN, only the difference will be described below.

In this embodiment, the address conversion table managing unit 41 constitutes an address manager configured to manage the home address (first address) HoA and the second routing address (third address) RA#2 of the mobile terminal (destination mobile terminal) MT#2 existing in the moving network 2.

The address conversion table managing unit 41 constitutes an address assignment information transmitter configured to assign a predetermined second routing address RA#2 to a new mobile terminal MT in response to an address assignment request for the new mobile terminal MT received by the location information managing unit 42, and thereby to transmit the address assignment information including the second routing address RA#2 to the network management server NCPF through the network management server I/F 43.

The address conversion table managing unit 41 may be configured to assign the predetermined second routing addresses RA#2 to the new mobile terminal MT in response to an direction from the network management server NCPF instead.

Meanwhile, when the address conversion table managing unit 41 detects that the access node AN to which the address conversion table managing unit 41 is connected via a radio link through the access node I/F 48, that is, when the address conversion table managing unit 41 detects a handover, the address conversion table managing unit 41 transmits an assignment request of the second routing addresses RA#2 for all the mobile terminals MT connected to the mobile node MN via a radio link, that is, all the mobile terminals MT managed in the address conversion table, to a forwarded access node AN through the access node I/F 48.

The location information managing unit 42 receives the address assignment request from the new mobile terminal MT newly entering the moving network 2, that is, the new mobile terminal MT whose home address (first address) HoA and the second routing address (third address) RA#2 are not managed by the address conversion table.

To be more precise, the location information managing unit 42 obtains the above-described address assignment request by transmitting broadcast information which can reach within the moving network 2.

The address converting unit 46 changes a destination address in the packet received from the access node AN#2, from the second routing address (third address) RA#2 of the mobile terminal (destination mobile terminal) MT#2 to the home address (first address) HoA of the mobile terminal (destination mobile terminal) MT#2.

The routing unit 47 constitutes a packet transmitter configured to transmit the packet to the mobile terminal (destination mobile terminal) MT#2 through the mobile terminal I/F 45 based on the changed destination address.

Figure 8:
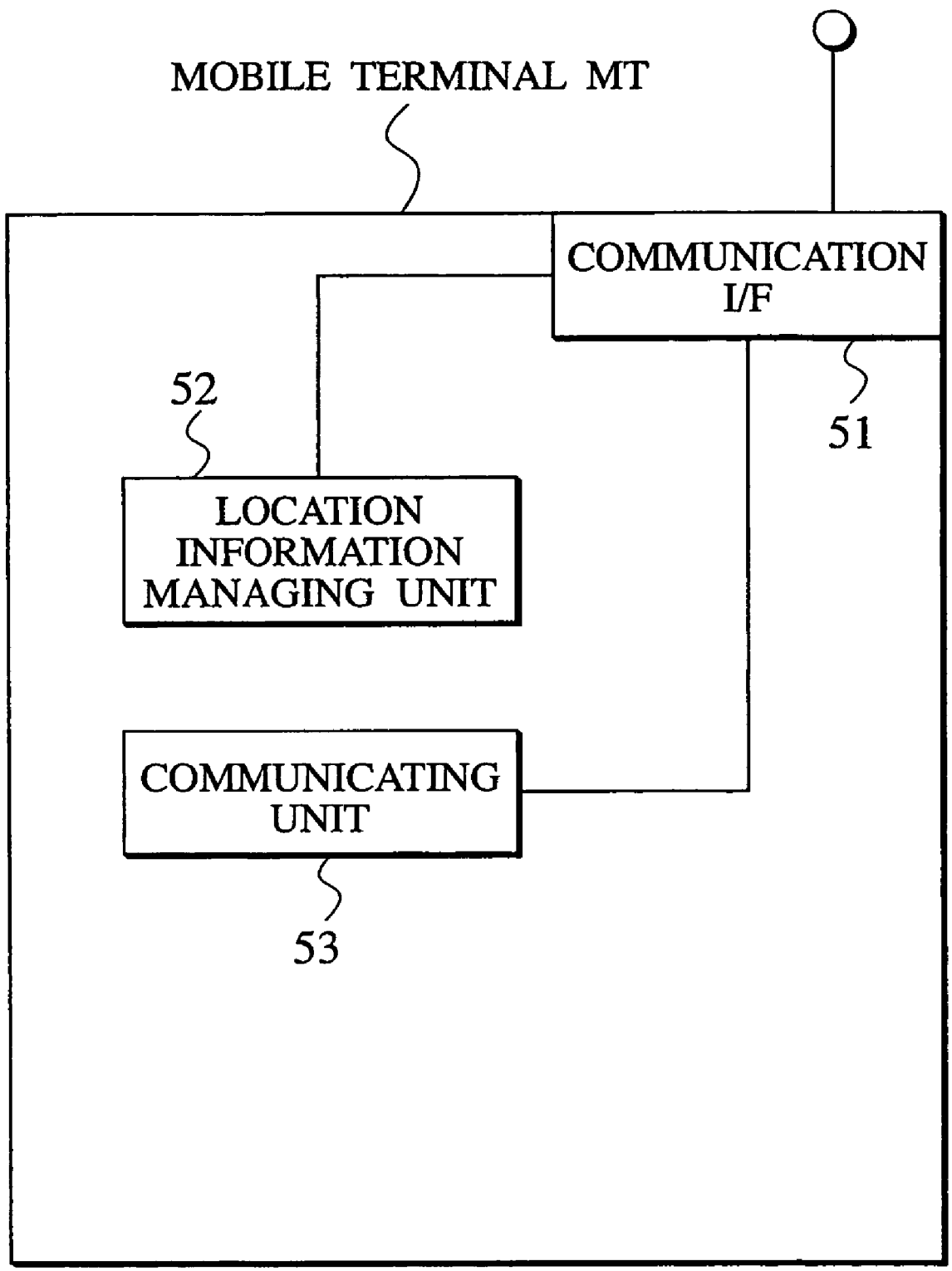
FIG. 8 is a functional block diagram of a mobile terminal of the mobile communication control system according to the first embodiment of the present invention.

As shown in FIG. 8, the mobile terminal MT includes a communication I/F 51, a location information managing unit 52, and a communicating unit 53.

The communication I/F 51 is configured to transmit/receive the packet to/from either the access node AN or the mobile node MN in which the mobile terminal MT exists through a radio link. The location information managing unit 52 is configured to perform location information registration processing concerning the mobile terminal MT. The communicating unit 53 is configured to generate the packet in response to an operation by a user.

(Actions of the Mobile Communication Control System of this Embodiment)

Actions of the mobile communication control system of this embodiment will be described with reference to FIG. 9 to FIG. 11.

Firstly, a packet transfer action in the mobile communication control system of this embodiment will be described with reference to FIG. 9.

Figure 9:
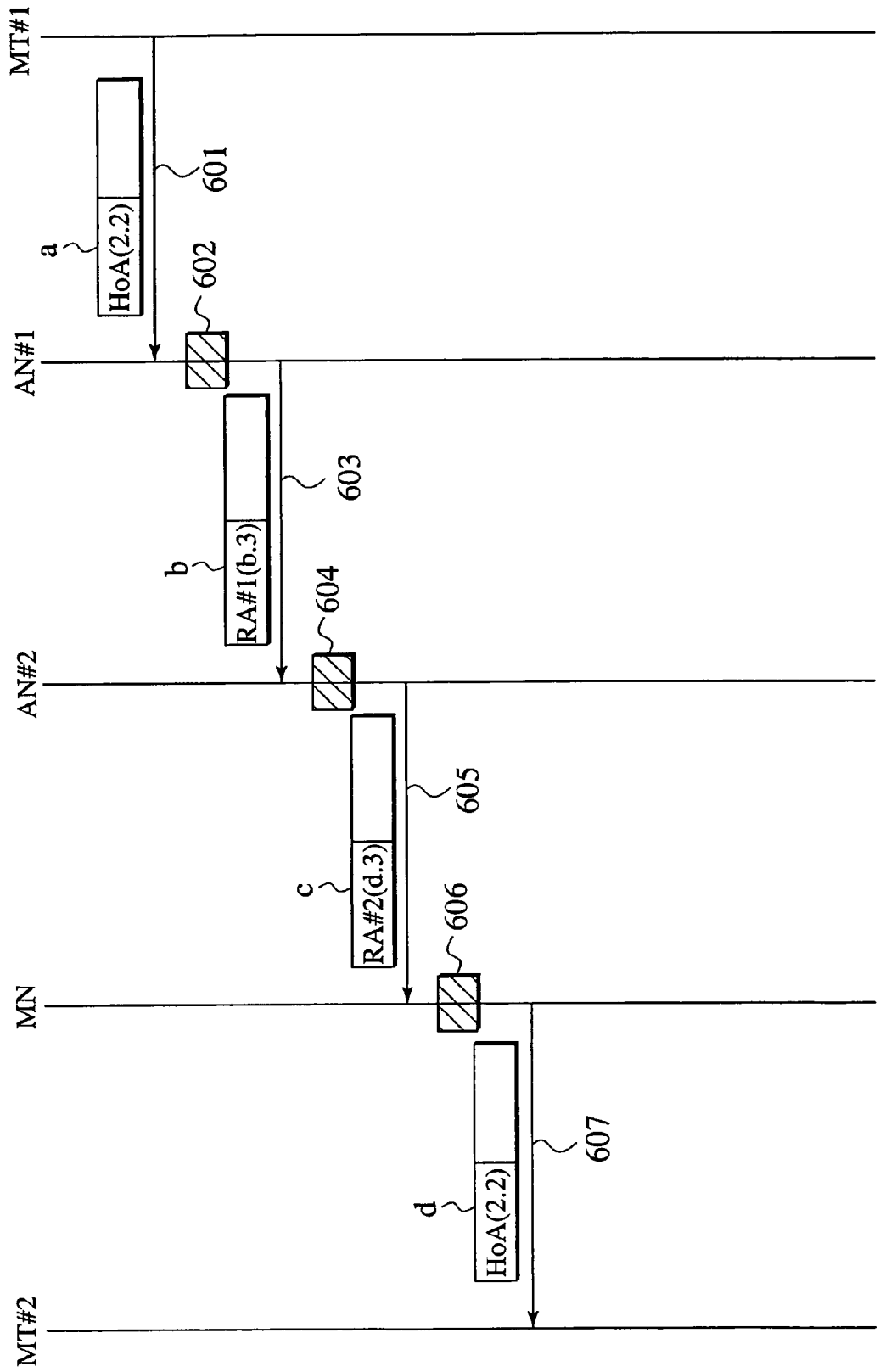
FIG. 9 is a sequence diagram showing a packet transfer action in the mobile communication control system according to the first embodiment of the present invention.

As shown in FIG. 9, in Step 601, the mobile terminal (source mobile terminal) MT#1 transmits a packet 'a' to the access node (source access node) AN#1 through a radio link.

The home address (first address) HoA "2.2" of the mobile terminal (destination mobile terminal) MT#2 is set as a destination address in the packet 'a'. The home address HoA of the mobile terminal MT#2 is a fixed address which does not include the location information of the mobile terminal MT#2.

In Step 602, the access node AN#1 changes the destination address in the packet 'a', from the home address HoA "2.2" of the mobile terminal MT#2 to the first routing address (second address) RA#1 "b.3" of the mobile terminal MT#2, referring to the address conversion table, so as to create a packet 'b'.

In Step 603, the access node AN#1 routes a packet 'b' containing the first routing address RA#1 "b.3" of the mobile terminal MT#2 in the destination address thereof, to the access node AN#2 through the core network 1.

In Step 604, the access node AN#2 changes the destination address in the packet 'b', from the first routing address RA#1 "b.3" of the mobile terminal MT#2 to the second routing address (third address) RA#2 "d.3" of the mobile terminal MT#2, referring to the address conversion table, so as to create a packet 'c'.

In Step 605, the access node AN#2 routes a packet 'c' containing the second routing address RA#2 "d.3" of the mobile terminal MT#2 in the destination address thereof, to the mobile node MN.

In Step 606, the mobile node MN changes the destination address in the packet 'c', from the second routing address RA#2 "d.3" of the mobile terminal MT#2 to the home address HoA "2.2" of the mobile terminal MT#2, referring to the address conversion table, so as to create a packet 'd'.

In Step 607, the mobile node MN transfers a packet 'd' containing the home address HoA "2.2" of the mobile terminal MT#2 in the destination address thereof, to the mobile terminal MT#2 through the moving network 2.

Secondly, an address assignment action in the mobile communication control system of this embodiment will be described with reference to FIG. 10.

In Step 701, the mobile node MN transmits the broadcast information which can reach the moving network 2. In Step 702, the mobile terminal MT#2 detects that the mobile terminal MT#2 enters in the moving network 2 managed by the mobile node MN which is not connected to the mobile terminal MT#2 via a radio link at the moment, in accordance with the received the broadcast information In Step 703, the mobile terminal MT#2 transmits the address assignment request to the mobile node MN identified by the above-described broadcast information. In Step 704, the mobile node MN assigns the predetermined second routing address RA#2 to the mobile terminal MT#2 in response to the received address assignment request.

The mobile node MN transmits the address assignment information including the home address HoA and the second routing address RA#2 of the mobile terminal MT#2 to the access node AN#2 in Step 705a and to the network management server NCPF in Step 705b.

The access node AN#2 assigns the predetermined first routing address RA#1 to the mobile terminal MT#2 in response to the received address assignment information in Step 706, and transmits address assignment information including the first routing address RA#1 and the second routing address RA#2 of the mobile terminal MT#2 to the network management server NCPF in Step 708.

The network management server NCPF receives the address assignment information from the mobile node MN in Step 707 and receives the address assignment information from the access node AN#2 in Step 709.

Then, the network management server NCPF registers the home address HoA, the first routing address RA#1, and the second routing address RA#2 of the mobile terminal MT#2 included in the received address assignment information, in the routing table. In other words, the network management server NCPF updates the routing table in response to the received address assignment information.

In Step 710, the network management server NCPF transmits an address assignment direction for directing the mobile node MN and the access nodes AN#1 and AN#2 to update the address conversion tables.

In Step 711, the mobile node MN transmits an address assignment response indicating completion of the address assignment concerning the mobile terminal MT#2 to the mobile terminal MT#2.

Thirdly, another address assignment action in the mobile communication control system of this embodiment will be described with reference to FIG. 11.

In Step 801, the mobile node MN detects that the mobile node MN enters in an area managed by an access node (second access node) AN#3 different from the access node AN#2 which is connected to the mobile node MN via a radio link at the moment.

In Step 802, the mobile node MN transmits to the access node AN#3 the address assignment request for all the mobile terminals MT which are connected to the mobile node MN via a radio link. The address assignment request can include the first routing addresses RA#1 of all the mobile terminals MT.

In Step 803, the access node AN#3 assigns the predetermined first routing addresses RA#1 to the mobile terminals MT in response to the received address assignment request.

In Step 804, the access node AN#3 transmits to the network management server NCPF the address assignment information including the first routing addresses RA#1 and the second routing addresses RA#2 of the mobile terminals MT.

In Step 805, the network management server NCPF updates the routing table based on the first routing addresses RA#1 and the second routing addresses RA#2 of the mobile terminals MT included in the received address assignment information.

In Step 806, the network management server NCPF transmits the address assignment direction to the access node AN#3. The access node AN#3 updates the address conversion table in response to the received address assignment direction.

The access node AN#3 transmits to the mobile node MN the address assignment response notifying completion of the address assignment to the mobile terminals MT in Step 807, and notifies the network management server NCPF of transmission of the address assignment response to the mobile node MN in Step 808.

In Step 809, the network management server NCPF transmits an address deletion direction to the access node AN#2 so as to delete the addresses concerning the mobile node MN from the address conversion table thereof.

The access node AN#2 updates the address conversion table in response to the received address deletion direction in Step 810, and transmits an address deletion response notifying completion of the updating to the network management server NCPF in Step 811.

In Step 812, the network management server NCPF transmits the address assignment direction including the home address HoA and the first routing address RA#1 of the mobile node MN, to the access node AN#1.

The access node AN#1 updates the address conversion table in response to the received address assignment direction in Step 813, and transmits an address update response notifying completion of the updating to the network management server NCPF in Step 814.

(Operations and Effects of the Mobile Communication Control System of this Embodiment)

According to the mobile communication control system of this embodiment, upon the packet transfer from the mobile terminal MT#1 to the mobile terminal MT#2, the address converting unit 36 of the access node AN#1 converts the home address HoA of the mobile terminal MT#2 set in the packet into the first routing address RA#1 of the mobile terminal MT#2. In the meantime, the address converting unit 36 of the access node AN#2 converts the first routing address RA#1 of the mobile terminal MT#2 set in the packet into the second routing address RA#2 of the mobile terminal MT#2, and the address converting unit 46 of the mobile node MN converts the second routing address RA#2 of the mobile terminal MT#2 set in the packet into the home address HoA of the mobile terminal MT#2. Therefore, it is possible to solve the problem of a large header size of the packet.

Moreover, according to the mobile communication control system of this embodiment, the packet is transferred from the mobile terminal MT#1 to the mobile terminal MT#2 through the access node AN#1, the access node AN#2, and the mobile node MN without passing through a home agent HA of the mobile node MN. Therefore, it is possible to solve the difficulty in achieving route optimization.

Furthermore, according to the mobile communication control system of this embodiment, the mobile terminal MT#1 is required to set only the home address HoA of the mobile terminal MT#2 as the destination address. Therefore, it is possible to solve the problem of location privacy.

(A Mobile Communication Control System According to a Second Embodiment of the Present Invention)

A mobile communication control system according to a second embodiment of the present invention will be described with reference to FIG. 12 to FIG. 17. In the following, description will be made mainly on a difference between the first embodiment and the second embodiment.

Figure 12:
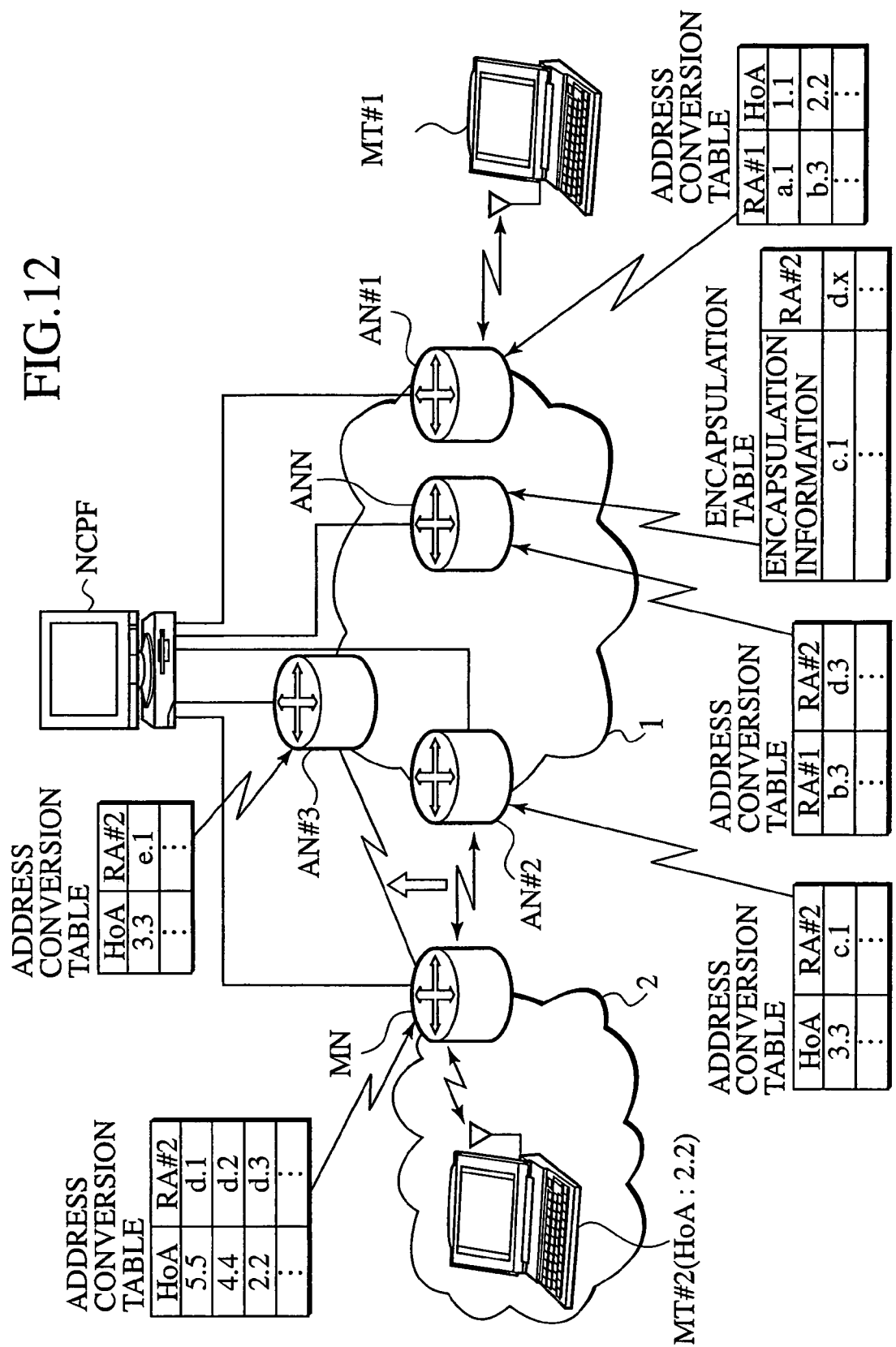
FIG. 12 is an overall block diagram of a mobile communication control system according to a second embodiment of the present invention.

As shown in FIG. 12, the mobile communication control system of this embodiment is different from the configuration of the mobile communication control system of the above-described first embodiment in that the mobile communication control system of this embodiment includes an anchor node ANN.

Figure 13:
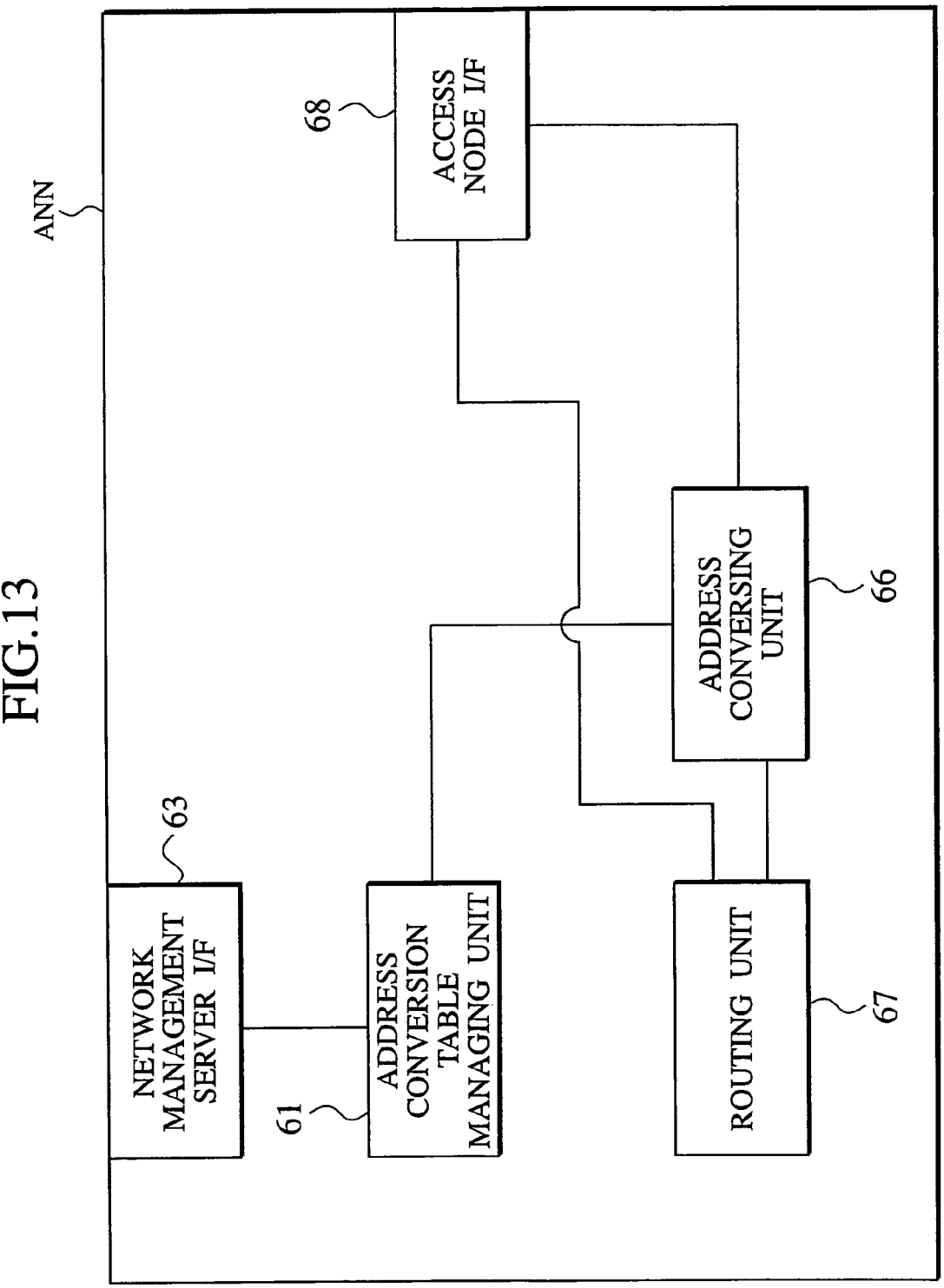
FIG. 13 is a functional block diagram of an anchor node of the mobile communication control system according to the second embodiment of the present invention.

As shown in FIG. 13, the anchor node ANN includes an address conversion table managing unit 61, a network management server I/F 63, an address converting unit 66, a routing unit 67, and an access node I/F 68. Since the functions of the respective units of the anchor node ANN are basically the same as the functions of the respective units of the above-described access node AN, only the difference will be described below.

The address conversion table managing unit 61 constitutes an address manager configured to manage the first routing address (second address) RA#1 and the second routing address (third address) RA#2 of the mobile terminal (destination mobile terminal) MT#2, and encapsulation information for specifying the mobile node MN.

To be more precise, the address conversion table managing unit 61 manages an address management table which links the first routing address RA#1 of the mobile terminal MT#2 with the second routing address RA#2 thereof.

Moreover, the address conversion table managing unit 61 manages an encapsulation table which links the encapsulation information for specifying the mobile node MN with an address area of the second routing address RA#2 of the mobile terminal MT#2.

The address converting unit 66 changes a destination address in the packet transmitted from the access node (source access node) AN#1, from the first routing address (second address) RA#1 of the mobile terminal (destination mobile terminal) MT#2 to the second routing address (third address) RA#2 of the mobile terminal (destination mobile terminal) MT#2.

Moreover, the address converting unit 66 makes reference to the encapsulation table and encapsulates the packet after the conversion of the destination address by use of the encapsulation information (such as the second routing address RA#2 of the mobile node MN) linked with the address area of the second routing address of the mobile terminal MT#2.

The encapsulation processing can be achieved by use of the IPv6 Routing Header Option technology or various Tunneling technologies.

The routing unit 67 routes the packet to the access node (destination access node) AN#2 connected to the mobile node MN based on the encapsulation information for specifying the mobile node MN.

In addition, the mobile communication control system of this embodiment is also different from the mobile communication control system of the first embodiment in terms of the configurations of the address conversion table managing unit 31 and the address converting unit 36 of the access node AN#2.

The address conversion table managing unit 31 of the access node AN#2 constitutes an address manager configured to manage the address conversion table to link the encapsulation information (such as the second routing address RA#2 of the mobile node MN) for specifying the mobile node MN connected to the access node (destination access node) AN#2 with the home address HoA of the mobile node MN.

Meanwhile, the address converting unit 36 judges whether or not the packet received through the core network 1 includes the second routing address (third address) RA#2 of the mobile terminal (destination mobile terminal) MT#2.

If a result of the judgment is positive, the packet is judged as a packet addressed to the mobile terminal MT#2. In this case, the routing unit 37 routes the packet decapsulated by the address converting unit 36 to the mobile node MN specified by the encapsulation information encapsulated in the packet.

On the contrary, if a result of the judgment is negative, the packet is judged as a packet addressed to another mobile node specified by the encapsulation information encapsulated in the packet. In this case, the address converting unit 36 converts the encapsulated encapsulation information into the home address HoA of the mobile node MN and the routing unit 37 routes the packet after the address conversion to the mobile node MN.

In addition, the mobile communication control system of this embodiment is also different from the mobile communication control system of the first embodiment in terms of the configuration of the routing table of the network management server NCPF.

To be more precise, as shown in FIG. 14, the routing table of the network management server NCPF manages the home addresses HoA of the mobile terminals MT and the mobile nodes MN in the core network 1, the first routing addresses of the mobile terminals MT and the mobile nodes MN, and the second routing addresses of the mobile terminals MT and the mobile nodes MN.

Figure 16:
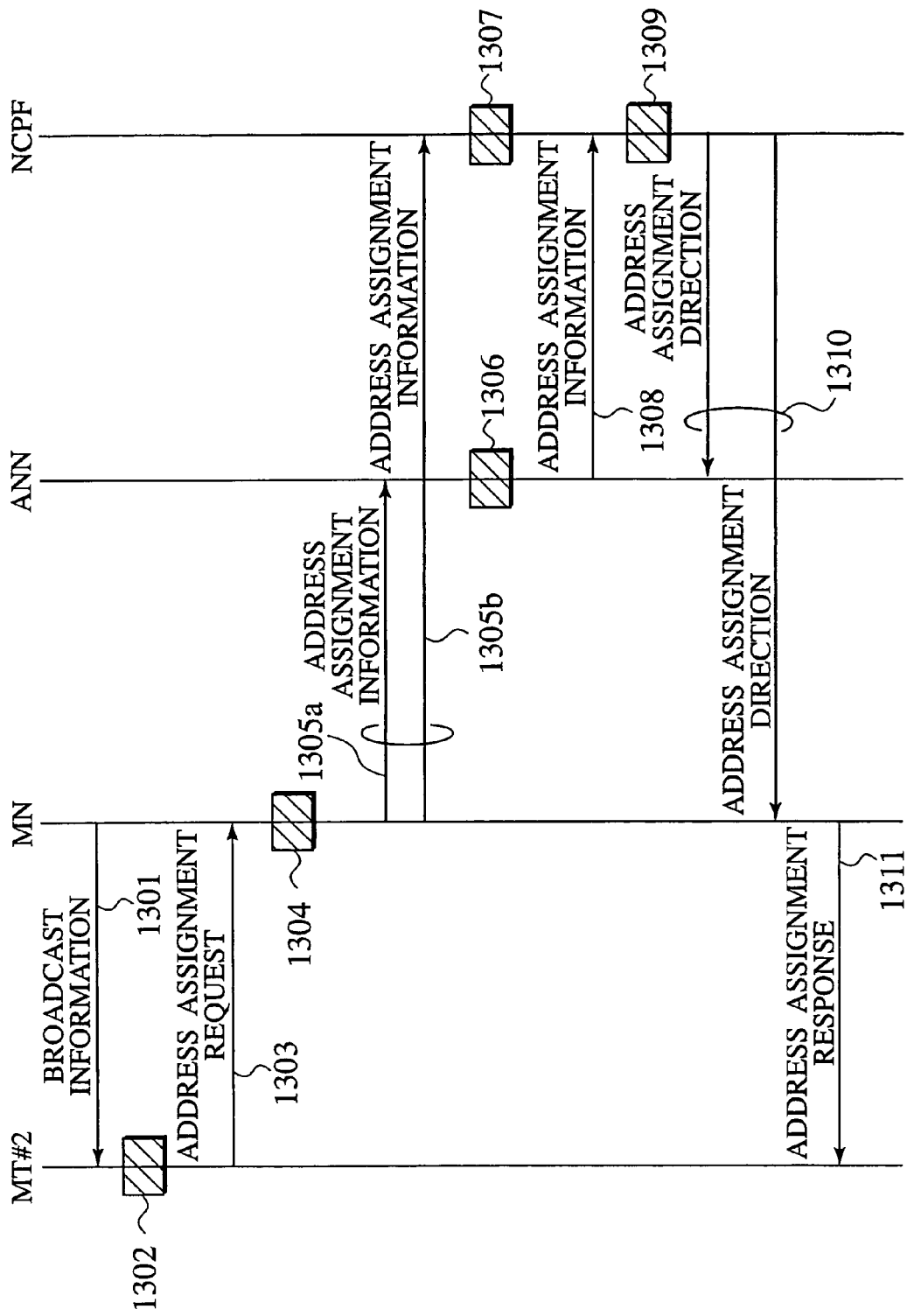
FIG. 16 is a sequence diagram showing an address assignment action in the mobile communication control system according to the second embodiment of the present invention.
Figure 17:
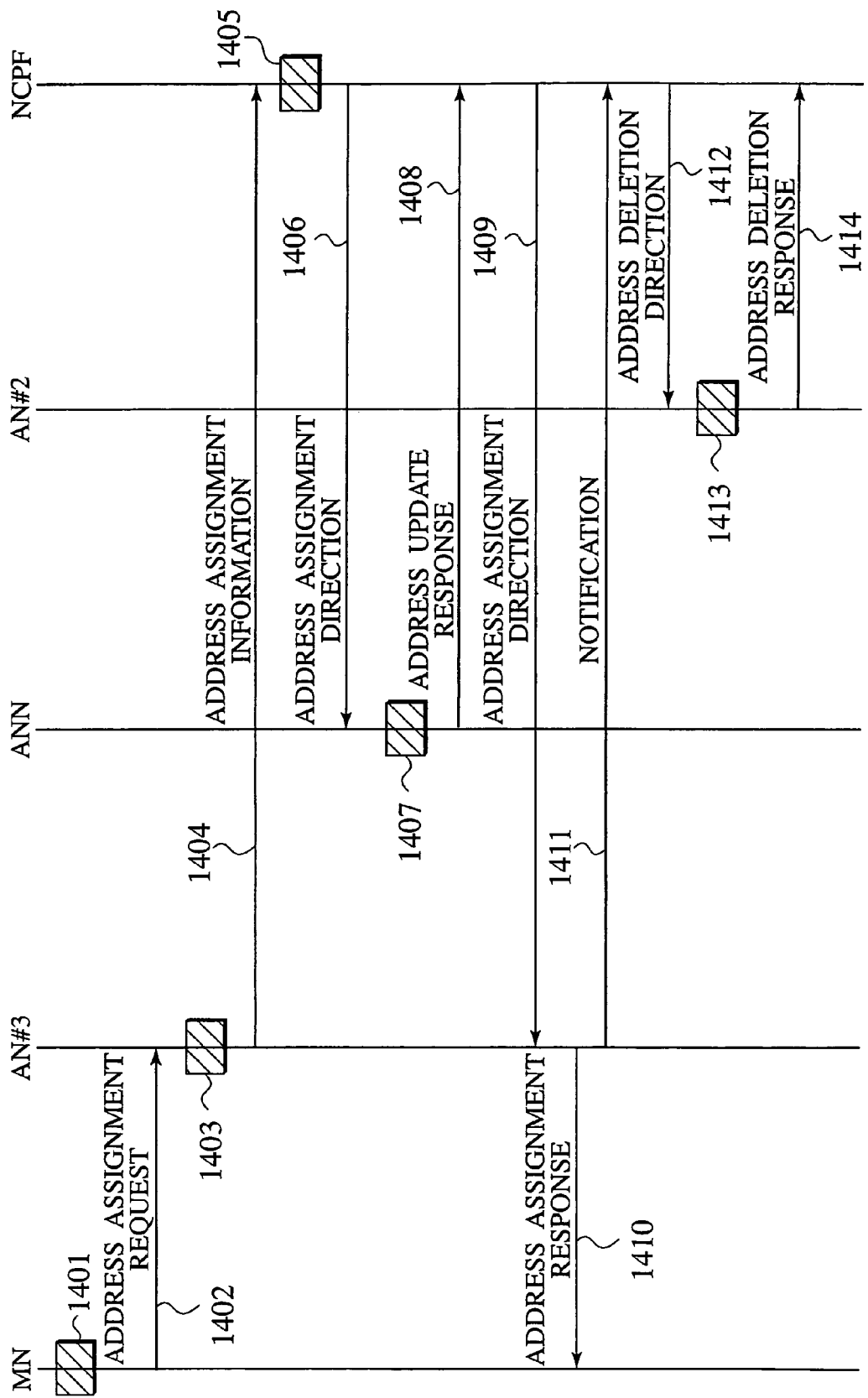
FIG. 17 is a sequence diagram showing another address assignment action in the mobile communication control system according to the second embodiment of the present invention.

Next, actions of the mobile communication control system of this embodiment will be described with reference to FIG. 15 to FIG. 17.

Firstly, a packet transfer action in the mobile communication control system of this embodiment will be described with reference to FIG. 15. Actions in Steps 1101 and 1102 are the same as the actions in Step 601 and 602 described in FIG. 9.

Figure 15:
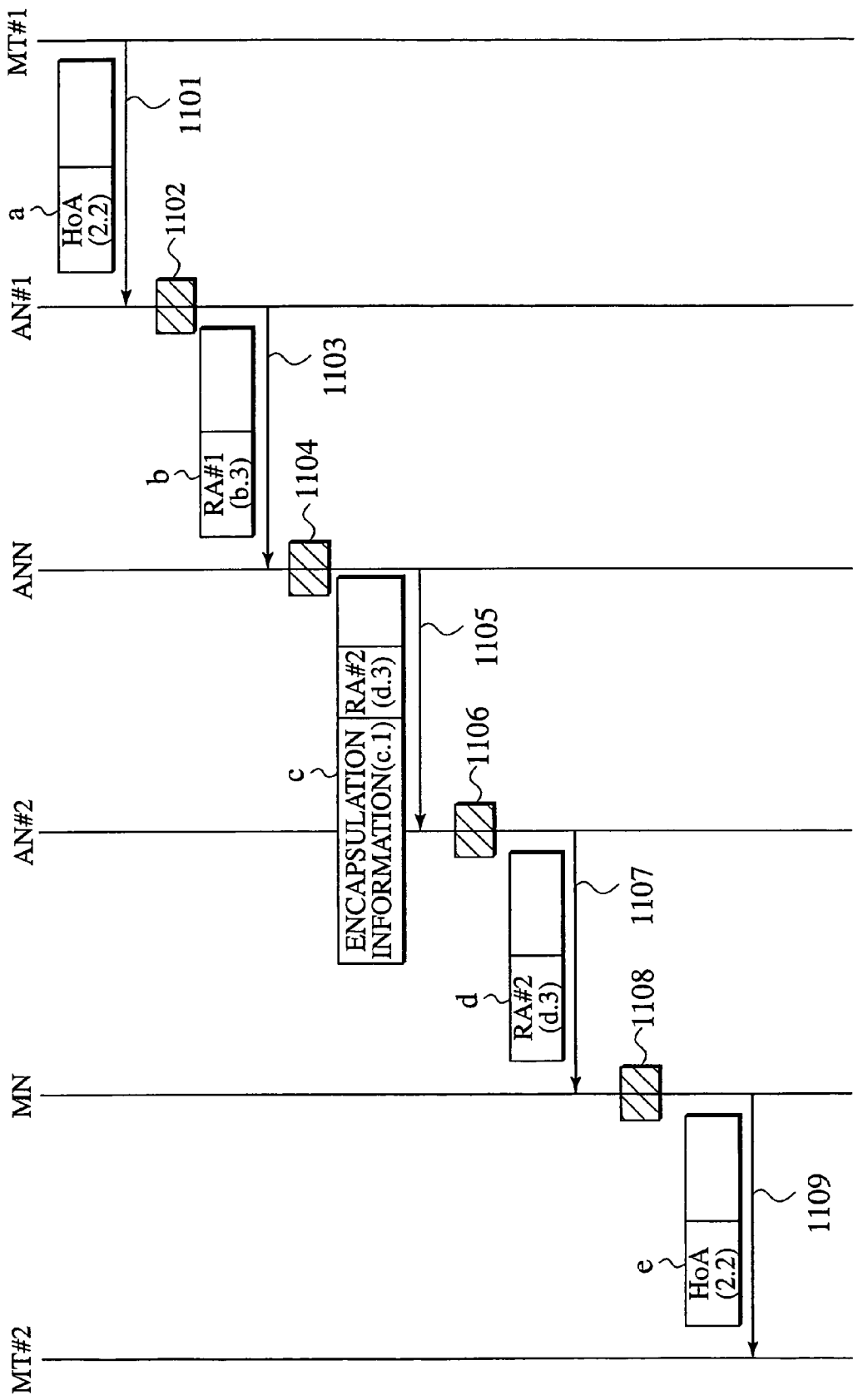
FIG. 15 is a sequence diagram showing a packet transfer action in the mobile communication control system according to the second embodiment of the present invention.

As shown in FIG. 15, in Step 1103, the access node AN#1 routes the packet 'b' to the anchor node ANN through the core network 1. The packet 'b' contains the first routing address RA#1 "b.3" of the mobile terminal MT#2 in the destination address.

In Step 1104, the anchor node ANN changes the destination address of the packet 'b', from the first routing address RA#1 "b.3" of the mobile terminal MT#2 to the second routing address RA#2 "d.3" of the mobile terminal MT#2, referring to the address conversion table. Then, the anchor node ANN encapsulates the packet 'b' with encapsulation information "c.1", referring to the address conversion table and the encapsulation table, so as to generate the packet 'c'.

In Step 1105, the anchor node ANN routes the packet 'c' to the access node AN#2. The packet 'c' is encapsulated with the encapsulation information "c.1" and contains the second routing address RA#2 "d.3" of the mobile terminal MT#2 in the destination address.

In Step 1106, the access node AN#2 judges that the second routing address RA#2 of the mobile terminal MT#2 is included in the received packet 'c', and therefore executes the decapsulation processing of the packet 'c', so as to generate the packet 'd'.

In Step 1107, the access node AN#2 routes the packet 'd' to the mobile node MN. The packet 'd' contains the second routing address RA#2 "d.3" of the mobile terminal MT#2 in the destination address.

Thereafter, actions in Steps 1108 and 1109 are the same as those in Steps 606 and 607 illustrated in FIG. 9.

Secondly, an address assignment action of the mobile communication control system of this embodiment will be described with reference to FIG. 16. As shown in FIG. 10 and FIG. 16, the address assignment action in the mobile communication control system of this embodiment is the same as that in the mobile communication control system of the first embodiment except that the access node AN#2 is replaced by the anchor node ANN.

Thirdly, another address assignment action in the mobile communication control system of this embodiment will be described with reference to FIG. 17. Actions in Steps 1401 and 1402 are the same as those in Steps 801 and 802 illustrated in FIG. 11.

In Step 1403, the access node AN#3 of the forwarded destination of the mobile node MN assigns encapsulation information "e.1" to the mobile node MN, in response to the address assignment request received from the mobile node MN.

In Step 1404, the access node AN#3 transmits the address assignment information including the encapsulation information and the home address HoA "3.3" of the mobile node MN to the network management server NCPF.

In Step 1405, the network management server NCPF updates the routing table based on the encapsulation information included in the received address assignment information and based on the home address HoA of the mobile node MN.

To be more precise, the network management server NCPF changes the encapsulation information from "c.1" to "e.1" in the routing table shown in FIG. 14.

In Step 1406, the network management server NCPF transmits the address assignment direction to the anchor node ANN.

In Step 1407, the anchor node ANN updates the encapsulation table in response to the received address assignment direction.

To be more precise, the anchor node ANN changes the encapsulation information from "c.1" to "e.1" in the encapsulation table as shown in FIG. 12.

In Step 1408, the anchor node ANN transmits the address update response to the network management server NCPF.

Figure 11:
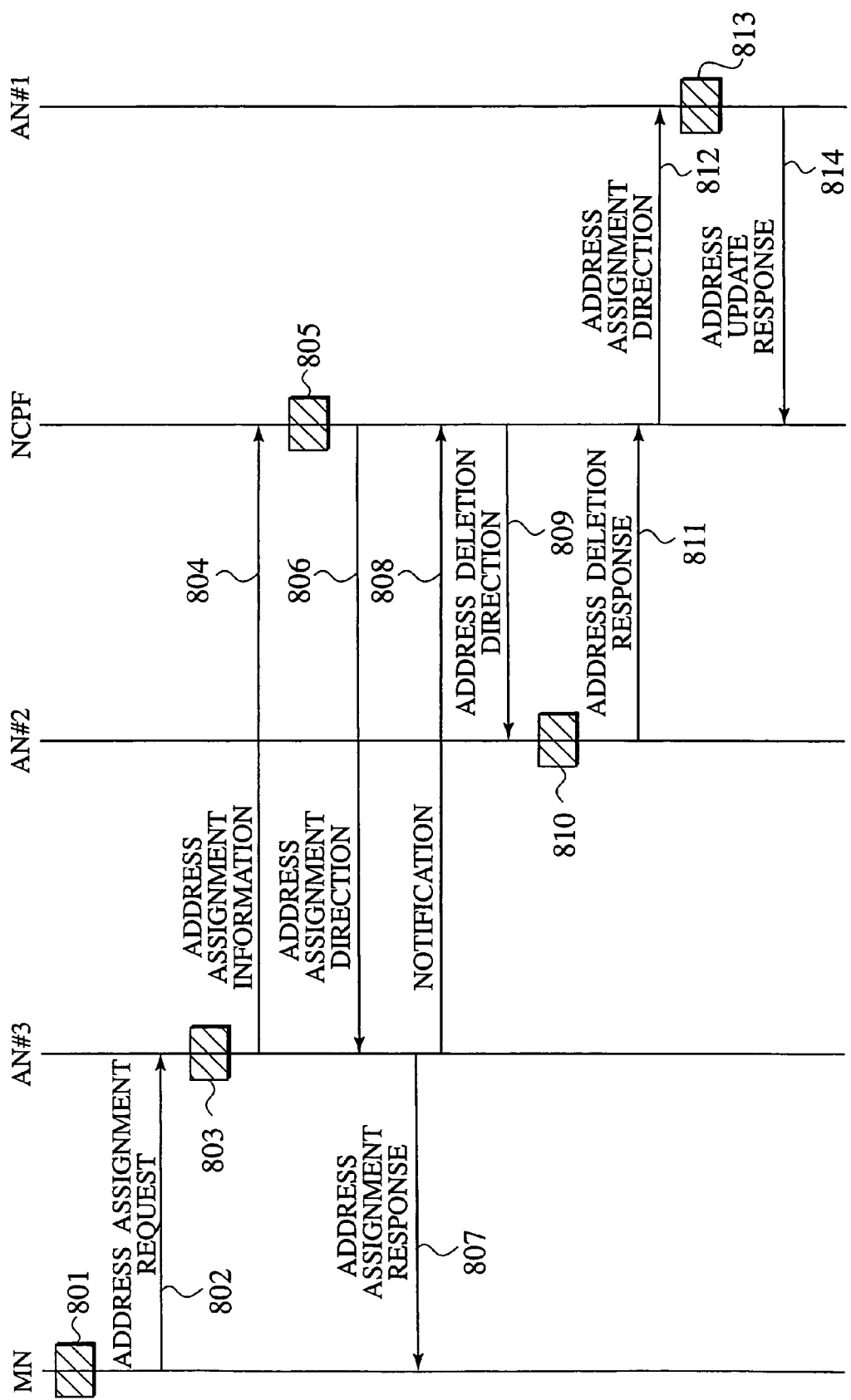
FIG. 11 is a sequence diagram showing another address assignment action in the mobile communication control system according to the first embodiment of the present invention.

Thereafter, actions from Steps 1409 to 1414 are the same as those in Steps 806 to 811 illustrated in FIG. 11.

According to the mobile communication control system of this embodiment, upon the packet transfer from the mobile terminal MT#1 to the mobile terminal MT#2, the address converting unit 36 of the access node AN#1 converts the home address HoA of the mobile terminal MT#2 set in the packet into the first routing address RA#1. In the meantime, the address converting unit 66 of the anchor node ANN converts the first routing address RA#1 of the mobile terminal MT#2 set in the packet into the second routing address RA#2 of the mobile terminal MT#2 and encapsulates the second routing address RA#2 by use of the encapsulation table, and then the address converting unit 46 of the mobile node MN converts the second routing address RA#2 of the mobile terminal MT#2 set in the packet into the home address HoA of the mobile terminal MT#2. Therefore, it is possible to solve the problem of a large header size of the packet in a radio link between the access node AN#2 and the destination mobile terminal MT#2.

Moreover, according to the mobile communication control system of this embodiment, the packet is transferred from the mobile terminal MT#1 to the mobile terminal MT#2 through the access node AN#1, the anchor node ANN, the access node AN#2, and the mobile node MN without passing through the home agent HA of the mobile node MN. Therefore, it is possible to solve the difficulty in achieving route optimization.

Furthermore, according to the mobile communication control system of this embodiment, the mobile terminal MT#1 is required to set only the home address HoA of the mobile terminal MT#2 as the destination address. Therefore, it is possible to solve the problem of location privacy.

According to the mobile communication control system of this embodiment, the address managing unit 31 of the access node AN#2 does not manage the first routing addresses RA#1 and the second routing addresses RA#2 of all the mobile terminals MT which are connected to the mobile node MN via a radio link. Therefore, when the access node AN connected to the mobile node MN via a radio link is changed (i.e. in the case of a handover), it is possible to minimize a scale of change in the contents to be managed by the address converting unit 36 and thereby to minimize a handover delay.

(A Mobile Communication Control System According to a Third Embodiment of the Present Invention)

A mobile communication control system according to a third embodiment of the present invention will be described with reference to FIG. 18 and FIG. 19. In the following, description will be made mainly on the difference between the first embodiment and the third embodiment.

Figure 18:
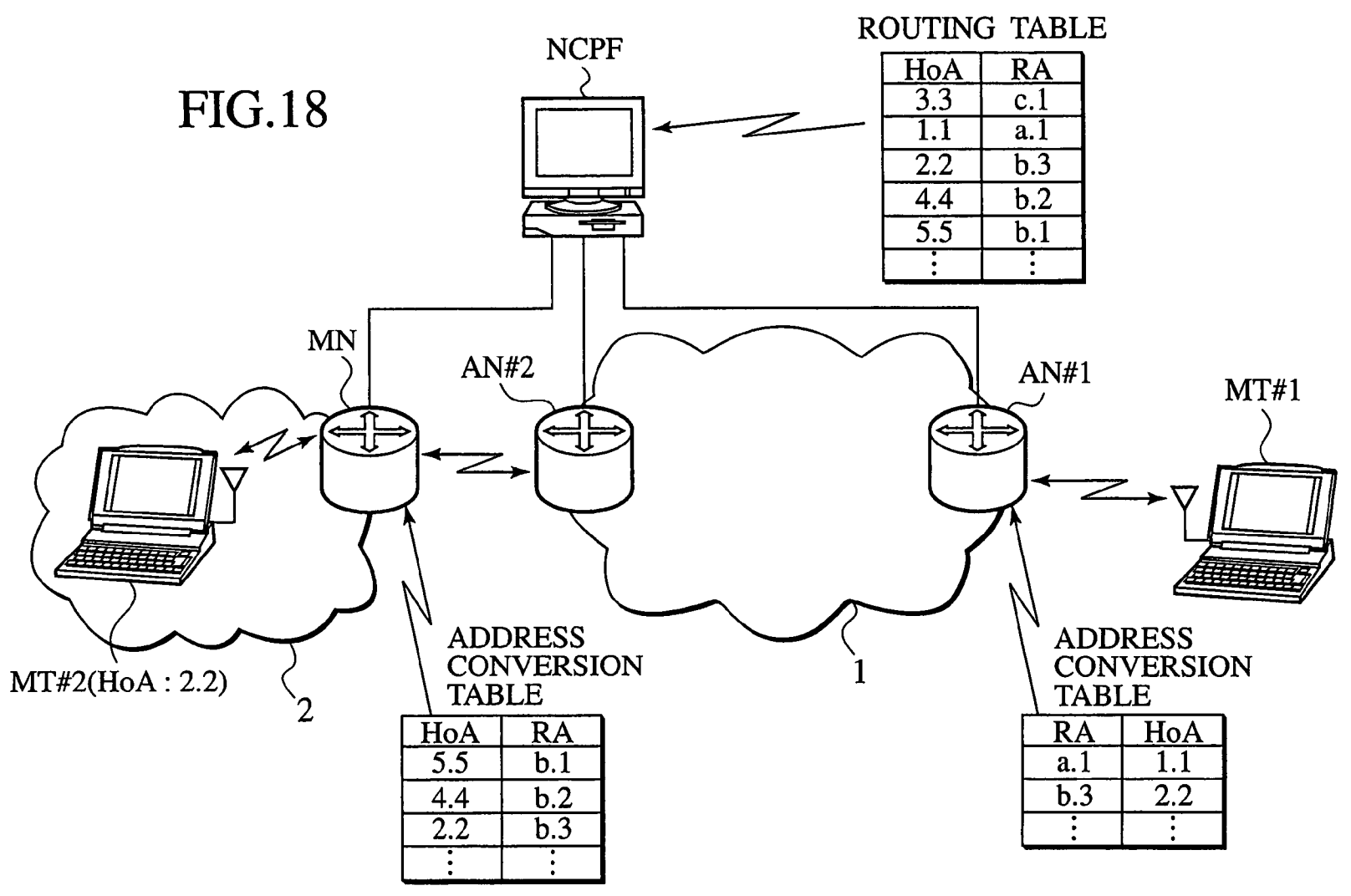

As shown in FIG. 18, the mobile communication control system of this embodiment is different from the configuration of the mobile communication control system of the above-described first embodiment in terms of an address assigner included in the access node AN#2 and the address managing unit 46 of the mobile node MN.

To be more precise, the address assigner is configured to assign a predetermined address area to the mobile node MN in accordance with an address assignment request transmitted from the mobile node. The predetermined address area is selected from among address areas assigned to the destination access node AN#2.

Furthermore, the address managing unit 46 assigns a routing address (second address) RA of the new mobile terminal MT included in the predetermined address area, in accordance with an address assignment request transmitted from the new mobile terminal MT, so as to manage the home address (first address) HoA and the routing address (second address) RA of the new mobile terminal MT. The home address (first address) HoA and the routing address (second address) RA are not managed by the address managing unit 46 at the moment.

In addition thereto, the mobile communication control system of this embodiment is also different from the mobile communication control system of the first embodiment in that the address conversion is not executed by the access node AN#2, and in terms of the configuration of the routing table of the network management server NCPF.

As shown in FIG. 18, the routing table of the network management server NCPF manages the home addresses (first addresses) HoA of the mobile terminals MT and the routing addresses (second addresses) RA thereof.

In FIG. 18, the routing addresses from "b.1" to "b.3" in the address conversion table of the mobile node MN are the routing addresses RA of the mobile terminals MT selected from among the predetermined address areas assigned by the access node AN#2.

Next, another address assignment action in the mobile communication control system of this embodiment will be described with reference to FIG. 19.

In Step 1601, the mobile node MN requests the access node AN#2 to assign a sub-network address (Prefix) indicating a predetermined address area.

In Step 1602, the access node AN#2 selects the predetermined address area from among the address areas assigned to itself.

In Step 1603, the access node AN#2 notifies the sub-network address (Prefix) indicating the predetermined address area to the mobile node MN.

In Step 1604, the mobile node MN receives and manages the sub-network address (Prefix) indicating the predetermined address area.

In Step 1611, the mobile terminal MT#2 newly entering the moving network 2 managed by the mobile node MN transmits the address assignment request to the mobile node MN.

In Step 1612, the mobile node MN assigns the routing address RA "b.3" selected from among the predetermined address areas, to the mobile terminal MT#2.

In Step 1613, the mobile node MN transmits the address assignment information including the routing address RA "b.3" to the network management server NCPF.

In Step 1614, the network management server NCPF updates the routing table in response to the received address assignment information.

Figure 10:
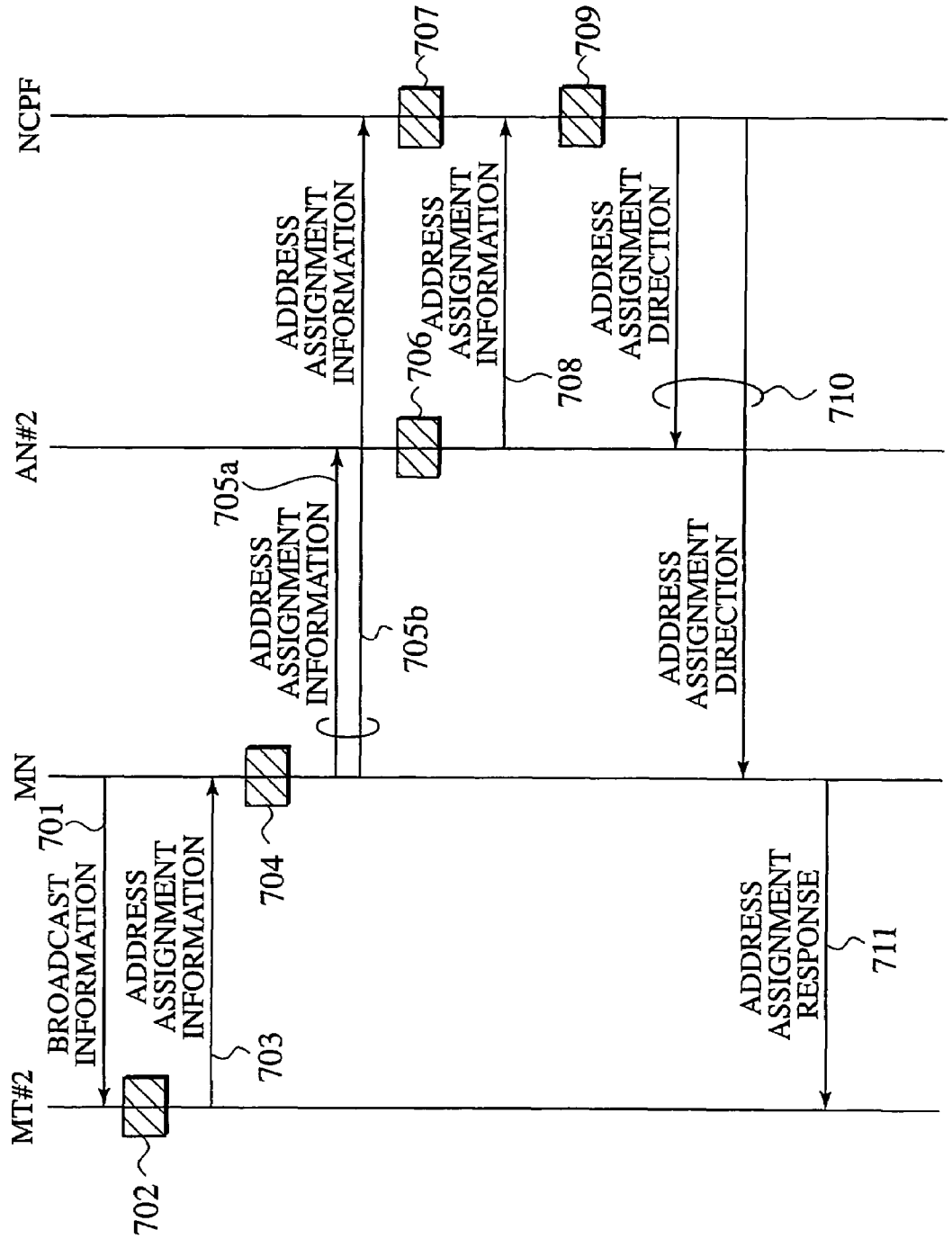
FIG. 10 is a sequence diagram showing an address assignment action in the mobile communication control system according to the first embodiment of the present invention.

Thereafter, actions in Steps 1615 and 1616 are the same as the actions in Steps 710 and 711 illustrated in FIG. 10.

A packet transfer action in the mobile communication control system of this embodiment will be briefly described.

Figure 19:
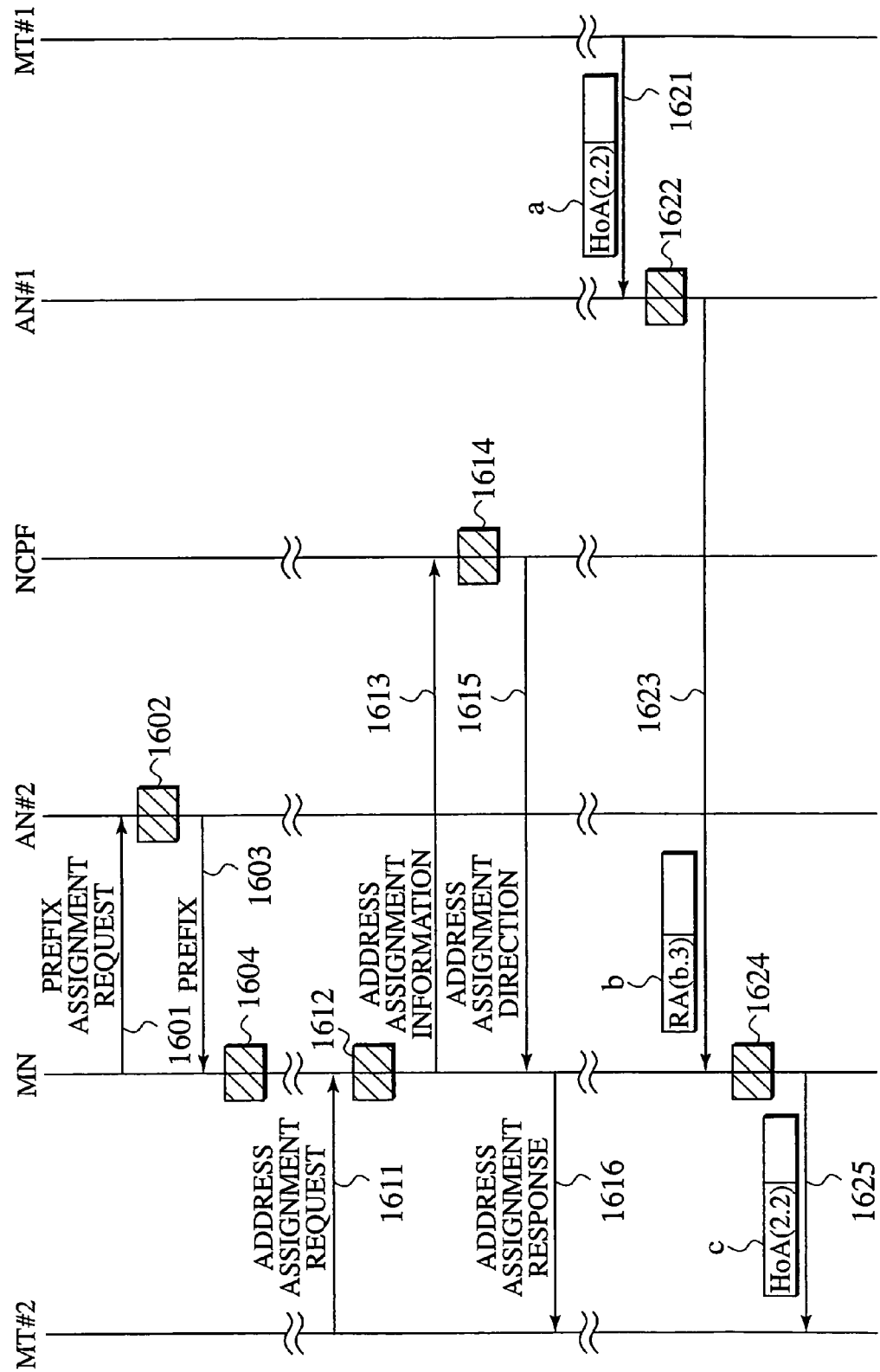
FIG. 19 is a sequence diagram showing an address assignment action in the mobile communication control system according to the third embodiment of the present invention.

As shown in FIG. 19, in Step 1621, the mobile terminal (source mobile terminal) MT#1 transmits the packet 'a' to the access node (source access node) AN#1 through the radio link. The home address (first address) HoA "2.2" of the mobile terminal (destination mobile terminal) MT#2 is set as the destination address in the packet 'a'.

In Step 1622, the access node AN#1 changes the destination address in the packet 'a', from the home address HoA "2.2" of the mobile terminal MT#2 to the routing address (second address) RA "b.3" of the mobile terminal MT#2, referring to the address conversion table, so as to generate the packet 'b'.

In Step 1623, the access node AN#1 routes the packet 'b', which contains the routing address RA "b.3" of the mobile terminal MT#2 in the destination address thereof, to the mobile node MN through the access node AN#2.

In Step 1624, the mobile node MN changes the destination address in the packet 'b', from the routing address RA "b.3" of the mobile terminal MT#2 to the home address HoA "2.2" of the mobile terminal MT#2, referring to the address conversion table, so as to generate the packet 'c'.

In Step 1625, the mobile node MN transfers the packet 'c', which contains the home address HoA "2.2" of the mobile terminal MT#2 in the destination address thereof, to the mobile terminal MT#2 through the moving network 2.

Note that the present invention is not only applied to the mobile communication control system of this embodiment, but is also applicable to any mobile communication control system including a mobile node which can be connected to a plurality of mobile terminals via a radio link under control of an access node (such as a mobile IP system).

(A Mobile Communication Control System According to a Fourth Embodiment of the Present Invention)

A mobile communication control system according to a fourth embodiment of the present invention will be described with reference to FIG. 20. The mobile communication control system of this embodiment is different from the mobile communication control systems according to the first to third embodiments in terms of the configuration of the routing table managing unit 11 of the network management server NCPF.

As shown in FIG. 20, the routing table managing unit 11 of the network management server NCPF collectively manages the addresses of a plurality of mobile terminals MT connected to the mobile node via a radio link.

Normally, the routing table managing unit 11 manages variable addresses such as Care of Addresses CoA and routing addresses RA for each the respective mobile terminal MT.

For example, as shown in FIG. 20, the routing table managing unit 11 manages a variable address #1 in a storage area for a mobile terminal MT#1 and manages a variable address #4 in a storage area for a mobile terminal MT#4.

However, when the mobile node MN changes the access node AN to be connected via a radio link, this configuration has a problem that the routing table managing unit 11 of the network management server NCPF have to access the storage areas for all the mobile terminals MT under control of the mobile node MN, so as to change the variable addresses.

Therefore, as shown in FIG. 20, this embodiment is configured to manage only a fact that the storage areas for mobile terminals MT#2 and MT#3 under control of a mobile node MN#1 belong to the mobile node MN#1, and to allow the storage area for the mobile node MN#1 to manage a variable address #2 of the mobile terminal MT#2 and a variable address #3 of the mobile terminal MT#3.

According to this configuration, even when the mobile node MN changes the access node AN to be connected via a radio link, the routing table managing unit 11 of the network management server NCPF is only required to access the storage area for the mobile node MN and to change the relevant variable address. Therefore, it is possible to save time required for updating the routing table.

Note that the routing table managing unit 11 of the network management server NCPF of the present invention is not only applied to the mobile communication control system of this embodiment, but is also applicable to any mobile communication control system including a mobile node which are connected to a plurality of mobile terminals via a radio link under control of an access node (such as a mobile IP system).

As described above, according to the present invention, it is possible to provide a mobile communication control system, a network management server, a mobile node, an access node, and an anchor node for supporting a moving network, so as to solve the above-described problems of the header size of a packet, the route optimization, and the location privacy.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A mobile communication control system having a plurality of access nodes and a mobile node, comprising:
a source access node to which a source mobile terminal is connected via a radio link, the source access node including,
an address manager configured to manage a first address, a second address, and a third address of a destination mobile terminal connected to the mobile node via a radio link, the first address of the destination mobile terminal being a home address of the destination mobile terminal, the second address being an address indicating a destination access node allocated to the destination mobile terminal and the third address being an address indicating the mobile node allocated to the destination mobile terminal;
an address changer configured to replace a destination address in a header of a packet transmitted from the source mobile terminal without increasing the size of the header, the first address of the destination mobile terminal replaced by the second address of the destination mobile terminal; and
a router configured to route the packet to the destination access node to which the mobile node is connected via a radio link, in accordance with the changed destination address;
the destination access node including,
an address manager configured to manage the second address and the third address of the destination mobile terminal;
an address changer configured to replace the destination address in the header of the received packet, the second address of the destination mobile terminal replaced by the third address of the destination mobile terminal without increasing the size of the header; and
a router configured to route the packet to the mobile node in accordance with the changed destination address; and
the mobile node including,
an address manager configured to manage the first address and the third address of the destination mobile terminal;
an address changer configured to replace the destination address in the header of the received packet, the third address of the destination mobile terminal replaced by the first address of the destination mobile terminal without increasing the size of the header; and
a packet transmitter configured to transmit the packet to the destination mobile terminal in accordance with the changed destination address.

2. The mobile communication control system according to claim 1, further comprising:
a network management server, wherein
the mobile node comprises an address assignment information transmitter configured to transmit address assignment information for a new mobile terminal to the network management server in accordance with an address assignment request transmitted from the new mobile terminal;
the network management server includes,
an address manager configured to manage a first address, a second address and a third address of the new mobile terminal in accordance with the received address assignment information; and
an address assignment direction transmitter configured to transmit an address assignment direction for the new mobile terminal to the source access node and the destination access node; and
the address manager of the source access node manages the first address and the second address of the new mobile terminal in accordance with the address assignment direction; and
the address manager of the destination access node manages the second address and the third address of the new mobile terminal in accordance with the address assignment direction.

3. The mobile communication control system according to claim 1, further comprising:
a network management server, wherein
the destination access node comprises an address assignment information transmitter configured to transmit address assignment information for the destination mobile terminal connected to the mobile node to the network management server in accordance with an address assignment request transmitted from the mobile node;

the network management server includes, comprises:

an address manager configured to manage the first address, the second address and the third address of the destination mobile terminal in accordance with the received address assignment information; and an address assignment direction transmitter configured to transmit an address assignment direction for the destination mobile terminal to the source access node; and the address manager of the source access node manages the first address and the second address of the destination mobile terminal in accordance with the address assignment direction.

4. A network management server in a mobile communication network for transferring a packet from a source mobile terminal to a destination mobile terminal connected to a mobile node via a radio link, the mobile node being connected to a destination access node via a radio link, the server comprising:

an address manager configured to manage a first address, a second address and a third address of the destination mobile terminal in accordance with address assignment information received from the mobile node and from the destination access node, the second address being an address indicating the destination access node allocated to the destination mobile terminal and the third address being an address indicating the mobile node allocated to the destination mobile terminal; and an address assignment direction transmitter configured to transmit address assignment directions for directing a source access node to which the source mobile terminal is connected to update an address conversion table of the source access node to include the first address and the second address of the destination mobile terminal, and to transmit an address assignment direction for directing the destination access node to update an address conversion table of the destination access node to include the second address and the third address of the destination mobile terminal, a source mobile terminal being connected to the source access node via radio link.

5. A network management server in a mobile communication network for transferring a packet from a source mobile terminal to a destination mobile terminal connected to a mobile node via a radio link, the mobile node being connected to a destination access node via a radio link, the server comprising:

an address manager configured to manage a first address, a second address and a third address of the destination mobile terminal in accordance with address assignment information received from the destination access node and from the mobile node, the second address being an address indicating the destination access node allocated to the destination mobile terminal and the third address is an address indicating the mobile node allocated to the destination mobile terminal; and an address assignment direction transmitter configured to transmit an address assignment direction, the address assignment direction directing a source access node to which the source mobile terminal is connected via radio link to update an address conversion table of the source access node to include the first address and the second address of the destination mobile terminal.

6. A mobile node in a mobile communication network for transferring a packet from a source mobile terminal to a destination mobile terminal, the source mobile terminal being connected to a source access node via radio link, the destination mobile terminal being connected to the mobile node via a radio link, the mobile node being connected to a destination access node via a radio link, the mobile node comprising:

an address manager configured to manage a first address and a third address of the destination mobile terminal;

an address changer configured to change a destination address in the packet transmitted from the source access node, from the third address of the destination mobile terminal to the first address of the destination mobile terminal, only one address associated with the destination mobile terminal provided in the packet;

a packet transmitter configured to transmit the packet to the destination mobile terminal in accordance with the changed destination address; and an address assignment information transmitter configured to transmit address assignment information including a first address and a third address of a new mobile terminal to a network management server in accordance with an address assignment request transmitted from the new mobile terminal.

7. The mobile node according to claim 6, further comprising an address assignment request transmitter configured to transmit an address assignment request for mobile terminals connected to the mobile node to a second access node, when the mobile node enters an area managed by the second access node different from a first access node to which the mobile node is connected at the moment.

8. An access node in a mobile communication network for transferring a packet to a destination mobile terminal connected to a mobile node via a radio link, the destination mobile terminal having first, second, and third addresses, the mobile node being connected to the access node via a radio link, the access node comprising:

an address manager configured to manage the second address and the third address of the destination mobile terminal connected to the mobile node via a radio link, the second address being an address indicating a destination access node allocated to the destination mobile terminal and the third address being an address indicating the mobile node allocated to a destination mobile terminal;

an address changer configured to replace a destination address in the packet transmitted from a source access node, the second address of the destination mobile terminal replaced by the third address of the destination mobile terminal, a source mobile terminal being connected to the source access node via a radio link;

a router configured to route the packet to the mobile node in accordance with the changed destination address; and an address assignment information transmitter configured to transmit address assignment information including the second address and the third address of the destination mobile terminal to a network management server in accordance with an address assignment request transmitted from the mobile node.

9. A mobile communication control system having a plurality of access nodes, an anchor node and a mobile node, comprising:

a source access node to which a source mobile terminal is connected via a radio link. including, an address manager configured to manage a first address and a second address of a destination mobile terminal connected to the mobile node via a radio link, the first address of the destination mobile terminal being a home address of the destination mobile terminal, the second address being an address indicating a destination access node allocated to the destination mobile terminal, and the third address being an address indicating a mobile node allocated to the destination mobile terminal;

an address changer configured to replace a destination address in a header of a packet transmitted from the source mobile terminal, the first address of the destination mobile terminal replaced by the second address of the destination mobile terminal without increasing the size of the header; and a router configured to route the packet to the anchor node in accordance with the changed destination address;

the anchor node including, an address manager configured to manage the second address and a third address of the destination mobile terminal and encapsulation information for specifying the mobile node;

an address changer configured to replace a destination address in the packet transmitted from the source access node, the second address of the destination mobile terminal replaced by the third address of the destination mobile terminal, and to encapsulate the packet using the encapsulation information; and a router configured to route the packet to a destination access node in accordance with the encapsulation information, the mobile node being connected to the destination access node via a radio link;

the destination access node including, an address manager configured to manage the encapsulation information; and a router configured to decapsulate the received packet, and to route the packet to the mobile node specified by the encapsulation information encapsulated in the packet, when the packet includes the third address of the destination mobile terminal; and the mobile node including, an address manager configured to manage the first address and the third address of the destination mobile terminal;

an address changer configured to replace a destination address in the received packet. the third address of the destination mobile terminal replaced by the first address of the destination mobile terminal; and a packet transmitter configured to transmit the packet to the destination mobile terminal in accordance with the changed destination address.

10. The mobile communication control system according to claim 9, further comprising:

a network management server, wherein the mobile node comprises an address assignment information transmitter configured to transmit address assignment information for a new mobile terminal to the network management server in accordance with an address assignment request transmitted from the new mobile terminal;

the network management server includes, an address manager configured to manage a first address, a second address and a third address of the new destination mobile terminal and the encapsulation information, in accordance with the received address assignment information; and an address assignment direction transmitter configured to transmit an address assignment direction for the new mobile terminal to the source access node and the anchor node;

the address manager of the source access node manages the first address and the second address of the new mobile terminal in accordance with the address assignment direction; and the address manager of the anchor node manages the second address and the third address of the new mobile terminal and the encapsulation information, in accordance with the address assignment direction.

11. The mobile communication control system according to claim 9, further comprising:

a network management server, wherein the source access node comprises an address assignment information transmitter configured to transmit address assignment information including the encapsulation information to the network management server in accordance with an address assignment request transmitted from the mobile node;

the network server includes, an address manager configured to manage the first addresses, the second addresses and the third addresses of the destination mobile terminal and the encapsulation information in accordance with the received address assignment information; and an address assignment direction transmitter configured to transmit an address assignment direction for the destination mobile terminal to the anchor node; and the address manager of the anchor node manages the first addresses, the second addresses and the third addresses of the destination mobile terminal and the encapsulation information, in accordance with the address assignment direction.

12. A network management server in a mobile communication network for transferring a packet to a destination mobile terminal via an anchor node, the mobile terminal being connected to a mobile node via a radio link, the mobile node being connected to a destination access node via a radio link, the server comprising:

an address manager configured to manage a first address, a second address and a third address of a new mobile terminal and encapsulation information for specifying the mobile node, in accordance with address assignment information for the new mobile terminal received from the mobile node and the anchor node, the second address being an address indicating the destination access node allocated to the destination mobile terminal and the third address being an address indicating the mobile node allocated to the destination mobile terminal; and an address assignment direction transmitter configured to transmit an address assignment direction for directing a source access node to update an address conversion table of the source access node to include the first address and the second address of the new mobile terminal, and to transmit an address assignment direction for directing the anchor node to update an address conversion table of the anchor node to include the second address and the third address of the new mobile terminal and the encapsulation information, a source mobile terminal being connected to the source access node.

13. A network management server in a mobile communication network for transferring a packet to a destination mobile terminal via an anchor node, the destination mobile terminal being connected to a mobile node via a radio link, the mobile node being connected to a destination access node via a radio link, the server comprising:

an address manager configured to manage a first address, a second address and a third address of the destination mobile terminal and encapsulation information for specifying the mobile node in accordance with address assignment information received from the mobile node and the anchor node, the second address being an address indicating the destination access node allocated to the destination mobile terminal and the third address being an address indicating the mobile node allocated to the destination mobile terminal; and an address assignment direction transmitter configured to transmit an address assignment direction for directing the anchor node to update an address conversion table of the anchor node to include the second address and the third address of the destination mobile terminal and the encapsulation information.

14. An anchor node in a mobile communication network for transferring a packet to a destination mobile terminal via an anchor node, the destination mobile terminal having three addresses including a first address which is the home address of the destination mobile terminal, the destination mobile terminal being connected to a mobile node via a radio link, the mobile node being connected to a destination access node via a radio link, the anchor node comprising:

an address manager configured to manage the second address and the third address of the destination mobile terminal and encapsulation information for specifying the mobile node, the second address being an address indicating the destination access node allocated to the destination mobile terminal and the third address being an address indicating the mobile node allocated to the destination mobile terminal;

an address changer configured to replace a destination address in a header of the packet transmitted from a source access node, the second address of the destination mobile terminal replaced by the third address of the destination mobile terminal without increasing the size of the header, and to encapsulate the packet using the encapsulation information, a source mobile terminal being connected to the source access node; and a router configured to route the encapsulated packet to the destination access node in accordance with the encapsulation information.

15. A mobile communication control system having a plurality of access nodes and a mobile node, comprising:

a source access node to which a source mobile terminal is connected via a radio link, including, an address manager configured to manage a first address and a second address of a destination mobile terminal connected to the mobile node via a radio link;

an address changer configured to replace a destination address in a header of a packet transmitted from the source mobile terminal, the first address of the destination mobile terminal replaced by the second address of the destination mobile terminal without increasing the size of the header, the first address of the destination mobile terminal being a home address of the destination mobile terminal; and a router configured to route the packet to the mobile node in accordance with the changed destination address; and the mobile node including, an address manager configured to manage the first address and the second address of a destination mobile terminal;

an address changer configured to replace a destination address in the header of the received packet, the second address of the destination mobile terminal replaced by the first address of the destination mobile terminal without increasing the size of the header; and a packet transmitter configured to transmit the packet to the destination mobile terminal in accordance with the changed destination address.

16. The mobile communication control system according to claim 15, wherein a destination access node to which the mobile node is connected via a radio link comprises an address assigner configured to assign a predetermined range of addresses to the mobile node in accordance with an address assignment request transmitted from the mobile node, the predetermined range of addresses being selected from among range of addresses assigned to the destination access node; and the address manager of the mobile node assigns a second address of a new mobile terminal included in the predetermined range of addresses in accordance with an address assignment request transmitted from the new mobile terminal, so as to manage a first address and the second address of the new mobile terminal.

17. A mobile node in a mobile communication network for transferring a packet to a destination mobile terminal connected to a mobile node via a radio link, the mobile node being connected to a destination access node via a radio link, the mobile node comprising:

an address manager configured to manage a first address and a second address of the destination mobile terminal, the first address of the destination mobile terminal being the home address of the destination mobile terminal;

an address changer configured to change a destination address in the packet transmitted from a source access node, from the second address of the destination mobile terminal to the first address of the destination mobile terminal, a source mobile terminal being connected to the source access node; and a packet transmitter configured to transmit the packet to the destination mobile terminal in accordance with the changed destination address;

and wherein the address manager assigns a second address to a new mobile terminal included in a predetermined range of addresses assigned by the destination access node in accordance with an address assignment request transmitted from the new mobile terminal, so as to manage a first address and the second address of the new mobile terminal.

* * * * *